(12) United States Patent
Verfuerth

(10) Patent No.: US 8,729,446 B2
(45) Date of Patent: May 20, 2014

(54) OUTDOOR LIGHTING FIXTURES FOR CONTROLLING TRAFFIC LIGHTS

(75) Inventor: Neal R. Verfuerth, Manitowoc, WI (US)

(73) Assignee: Orion Energy Systems, Inc., Manitowoc, WI (US)

( * ) Notice: Subject to any disclaimer, the term of this patent is extended or adjusted under 35 U.S.C. 154(b) by 0 days.

(21) Appl. No.: 13/223,151

(22) Filed: Aug. 31, 2011

(65) Prior Publication Data

US 2012/0038490 A1    Feb. 16, 2012

Related U.S. Application Data

(63) Continuation-in-part of application No. 12/550,270, filed on Aug. 28, 2009, now Pat. No. 8,450,670, which is a continuation-in-part of application No. 11/771,317, filed on Jun. 29, 2007, now Pat. No. 7,638,743, and a continuation-in-part of application No. 12/240,805, filed on Sep. 29, 2008, now Pat. No. 8,344,665, which is a continuation-in-part of application No. 12/057,217, filed on Mar. 27, 2008, now Pat. No. 8,406,937, application No. 13/223,151, which is a continuation-in-part of application No. 12/875,930, filed on Sep. 3, 2010.

(60) Provisional application No. 61/275,985, filed on Sep. 4, 2009, provisional application No. 61/380,112, filed on Sep. 3, 2010.

(51) Int. Cl.
  *G01J 1/32*    (2006.01)
  *G08G 1/097*   (2006.01)
  *G08G 1/01*    (2006.01)

(52) U.S. Cl.
  USPC .......................... 250/205; 340/931; 340/933

(58) Field of Classification Search
  CPC .............. G01J 1/32; H05B 37/00; G08G 1/00
  USPC .............. 340/539.22, 539.1, 815.4, 901, 903, 340/931, 933; 315/88, 129, 152, 154; 362/217.16, 427; 250/205, 221, 222.1; 348/143
  See application file for complete search history.

(56) References Cited

U.S. PATENT DOCUMENTS 1,254,520 A   1/1918   Macduff
2,403,240 A   7/1946   Sawin (Continued)

FOREIGN PATENT DOCUMENTS

GB    2 237 826    5/1991
GB    2 250 172    6/1992

(Continued)

OTHER PUBLICATIONS

U.S. Appl. No. 13/249,001, filed Sep. 29, 2011, Verfuerth et al.

(Continued)

*Primary Examiner* — Kevin Pyo
*Assistant Examiner* — Don Williams
(74) *Attorney, Agent, or Firm* — Foley & Lardner LLP

(57) ABSTRACT

An outdoor lighting fixture for communicating with a traffic light system is shown and described. The outdoor lighting fixture includes a ballast for providing current to at least one lamp and a fixture housing at least partially surrounding the ballast and the at least one lamp. The outdoor lighting fixture further includes a mount configured to hold the fixture housing to a pole and a control circuit wired to the ballast. A sensor and a radio frequency transceiver are wired to the control circuit. The control circuit is configured to process inputs from the sensor to determine whether to send a light change instruction to the traffic system via the radio frequency transceiver.

18 Claims, 7 Drawing Sheets

(56) References Cited

U.S. PATENT DOCUMENTS

| | | | |
|---|---|---|---|
| 2,485,148 A | 10/1949 | Fralin | |
| 2,636,977 A | 4/1953 | Foster | |
| 3,292,319 A | 12/1966 | McCarthy | |
| 3,337,035 A | 8/1967 | Pennybacker | |
| 3,416,266 A | 12/1968 | Eron | |
| 3,511,559 A | 5/1970 | Foster | |
| 3,757,290 A | 9/1973 | Ross et al. | |
| 4,023,043 A | 5/1977 | Stevenson | |
| 4,114,186 A | 9/1978 | Dominguez | |
| 4,135,181 A | 1/1979 | Bogacki et al. | |
| 4,144,462 A | 3/1979 | Sieron et al. | |
| 4,190,800 A | 2/1980 | Kelly et al. | |
| 4,204,194 A | 5/1980 | Bogacki | |
| 4,204,195 A | 5/1980 | Bogacki | |
| 4,306,769 A | 12/1981 | Martinet | |
| 4,360,881 A | 11/1982 | Martinson | |
| 4,387,417 A | 6/1983 | Plemmons et al. | |
| 4,489,386 A | 12/1984 | Breddan | |
| 4,727,593 A | 2/1988 | Goldstein | |
| 4,733,505 A | 3/1988 | Van Dame | |
| 4,809,468 A | 3/1989 | Bareiss | |
| 4,841,914 A | 6/1989 | Chattan | |
| 4,883,340 A | 11/1989 | Dominguez | |
| 4,998,095 A | 3/1991 | Shields | |
| 5,099,622 A | 3/1992 | Sutton | |
| 5,165,465 A | 11/1992 | Kenet | |
| 5,253,444 A | 10/1993 | Donoho et al. | |
| 5,261,179 A | 11/1993 | Schwinler | |
| 5,353,543 A | 10/1994 | Teraoka | |
| 5,371,661 A | 12/1994 | Simpson | |
| 5,426,620 A | 6/1995 | Budney | |
| 5,546,712 A | 8/1996 | Bixby | |
| 5,572,438 A | 11/1996 | Ehlers et al. | |
| 5,598,042 A | 1/1997 | Mix et al. | |
| 5,644,173 A | 7/1997 | Elliason et al. | |
| 5,649,394 A | 7/1997 | Ohba | |
| 5,655,339 A | 8/1997 | DeBlock et al. | |
| 5,713,160 A | 2/1998 | Heron | |
| 5,717,609 A | 2/1998 | Packa et al. | |
| 5,729,387 A | 3/1998 | Takahashi et al. | |
| 5,758,331 A | 5/1998 | Johnson | |
| 5,836,114 A | 11/1998 | Ohba | |
| 5,918,404 A | 7/1999 | Ohba | |
| 5,956,462 A | 9/1999 | Langford | |
| 5,962,989 A | 10/1999 | Baker | |
| 6,003,471 A | 12/1999 | Ohba | |
| 6,122,603 A | 9/2000 | Budike, Jr. | |
| 6,169,979 B1 | 1/2001 | Johnson | |
| 6,257,735 B1 | 7/2001 | Baar | |
| D447,266 S | 8/2001 | Verfuerth | |
| 6,363,667 B2 | 4/2002 | O'Neill | |
| 6,367,419 B1 | 4/2002 | Gosselin | |
| 6,418,674 B1 | 7/2002 | Deraedt | |
| D463,059 S | 9/2002 | Verfuerth | |
| 6,467,933 B2 | 10/2002 | Baar | |
| 6,528,782 B1 | 3/2003 | Zhang et al. | |
| 6,528,957 B1 | 3/2003 | Luchaco | |
| 6,535,859 B1 | 3/2003 | Yablonowski et al. | |
| 6,585,396 B1 | 7/2003 | Verfuerth | |
| D479,826 S | 9/2003 | Verfuerth et al. | |
| 6,622,097 B2 | 9/2003 | Hunter | |
| 6,633,823 B2 | 10/2003 | Bartone et al. | |
| 6,644,836 B1 | 11/2003 | Adams | |
| D483,332 S | 12/2003 | Verfuerth | |
| 6,671,586 B2 | 12/2003 | Davis et al. | |
| 6,717,660 B1 | 4/2004 | Bernardo | |
| 6,731,080 B2 | 5/2004 | Flory | |
| D494,700 S | 8/2004 | Hartman et al. | |
| 6,785,592 B1 | 8/2004 | Smith et al. | |
| 6,813,864 B2 | 11/2004 | Landis | |
| 6,828,695 B1 | 12/2004 | Hansen | |
| 6,832,135 B2 | 12/2004 | Ying | |
| 6,894,609 B2 | 5/2005 | Menard et al. | |
| 6,938,210 B1 | 8/2005 | Huh | |
| 6,979,097 B2 | 12/2005 | Elam et al. | |
| 6,983,210 B2 | 1/2006 | Matsubayashi et al. | |
| 6,990,394 B2 | 1/2006 | Pasternak | |
| 7,027,736 B1 | 4/2006 | Mier-Langner et al. | |
| 7,130,719 B2 | 10/2006 | Ehlers et al. | |
| 7,130,832 B2 | 10/2006 | Bannai et al. | |
| 7,167,777 B2 | 1/2007 | Budike, Jr. | |
| 7,259,527 B2 | 8/2007 | Foo | |
| 7,264,177 B2 | 9/2007 | Buck et al. | |
| D557,817 S | 12/2007 | Verfuerth | |
| 7,307,542 B1 | 12/2007 | Chandler et al. | |
| D560,469 S | 1/2008 | Bartol et al. | |
| 7,369,056 B2 | 5/2008 | McCollough, Jr. | |
| 7,401,942 B1 | 7/2008 | Verfuerth et al. | |
| 7,446,671 B2 | 11/2008 | Giannopoulos et al. | |
| 7,518,531 B2 | 4/2009 | Butzer et al. | |
| D595,894 S | 7/2009 | Verfuerth et al. | |
| 7,563,006 B1 | 7/2009 | Verfuerth et al. | |
| 7,575,338 B1 | 8/2009 | Verfuerth | |
| D606,697 S | 12/2009 | Verfuerth et al. | |
| 7,628,506 B2 | 12/2009 | Verfuerth et al. | |
| 7,638,743 B2 | 12/2009 | Bartol et al. | |
| 7,660,652 B2 | 2/2010 | Smith et al. | |
| D617,028 S | 6/2010 | Verfuerth et al. | |
| D617,029 S | 6/2010 | Verfuerth et al. | |
| 7,738,999 B2 | 6/2010 | Petite | |
| 7,746,003 B2 | 6/2010 | Verfuerth et al. | |
| 7,762,861 B2 | 7/2010 | Verfuerth et al. | |
| D621,410 S | 8/2010 | Verfuerth et al. | |
| D621,411 S | 8/2010 | Verfuerth et al. | |
| 7,780,310 B2 | 8/2010 | Verfuerth et al. | |
| 7,784,966 B2 | 8/2010 | Verfuerth et al. | |
| D623,340 S | 9/2010 | Verfuerth et al. | |
| 7,812,543 B2 | 10/2010 | Budike, Jr. | |
| 7,847,706 B1 | 12/2010 | Ross et al. | |
| 7,859,398 B2 | 12/2010 | Davidson et al. | |
| D632,006 S | 2/2011 | Verfuerth et al. | |
| 8,033,686 B2 | 10/2011 | Recker et al. | |
| 8,035,320 B2 | 10/2011 | Sibert | |
| D650,225 S | 12/2011 | Bartol et al. | |
| 8,070,312 B2 | 12/2011 | Verfuerth et al. | |
| 8,138,690 B2 | 3/2012 | Chemel et al. | |
| 8,255,090 B2 | 8/2012 | Frader-Thompson et al. | |
| 8,450,670 B2 | 5/2013 | Verfuerth et al. | |
| 2001/0055965 A1 | 12/2001 | Delp et al. | |
| 2002/0060283 A1 | 5/2002 | Jordan et al. | |
| 2002/0065583 A1 | 5/2002 | Okada et al. | |
| 2002/0082748 A1 | 6/2002 | Enga et al. | |
| 2002/0103655 A1 | 8/2002 | Boies et al. | |
| 2002/0162032 A1 | 10/2002 | Gundersen et al. | |
| 2002/0172049 A1 | 11/2002 | Yueh | |
| 2002/0173321 A1 | 11/2002 | Marsden et al. | |
| 2003/0011486 A1 | 1/2003 | Ying | |
| 2003/0016143 A1* | 1/2003 | Ghazarian | 340/901 |
| 2003/0036820 A1 | 2/2003 | Yellepeddy et al. | |
| 2003/0041017 A1 | 2/2003 | Spool et al. | |
| 2003/0041038 A1 | 2/2003 | Spool et al. | |
| 2003/0046252 A1 | 3/2003 | Spool et al. | |
| 2003/0084358 A1 | 5/2003 | Bresniker et al. | |
| 2003/0084359 A1 | 5/2003 | Bresniker et al. | |
| 2003/0093332 A1 | 5/2003 | Spool et al. | |
| 2003/0171851 A1 | 9/2003 | Brickfield et al. | |
| 2003/0179577 A1 | 9/2003 | Marsh | |
| 2004/0006439 A1 | 1/2004 | Hunter | |
| 2004/0024483 A1 | 2/2004 | Holcombe | |
| 2004/0076001 A1 | 4/2004 | Lutes | |
| 2004/0078153 A1 | 4/2004 | Bartone et al. | |
| 2004/0078154 A1 | 4/2004 | Hunter | |
| 2004/0083163 A1 | 4/2004 | Cooper | |
| 2004/0095237 A1 | 5/2004 | Chen et al. | |
| 2004/0128266 A1 | 7/2004 | Yellepeddy et al. | |
| 2004/0193329 A1 | 9/2004 | Ransom et al. | |
| 2004/0201448 A1 | 10/2004 | Wang | |
| 2005/0027636 A1 | 2/2005 | Gilbert et al. | |
| 2005/0034023 A1 | 2/2005 | Maturana et al. | |
| 2005/0035717 A1 | 2/2005 | Adamson et al. | |
| 2005/0038571 A1 | 2/2005 | Brickfield et al. | |
| 2005/0043860 A1 | 2/2005 | Petite | |
| 2005/0124346 A1 | 6/2005 | Corbett et al. | |
| 2005/0232289 A1 | 10/2005 | Walko et al. | |

(56) References Cited

U.S. PATENT DOCUMENTS

| | | |
|---|---|---|
| 2006/0002110 A1 | 1/2006 | Dowling et al. |
| 2006/0044152 A1 | 3/2006 | Wang |
| 2006/0065750 A1 | 3/2006 | Fairless |
| 2006/0085301 A1 | 4/2006 | Leahy |
| 2006/0125426 A1 | 6/2006 | Veskovic et al. |
| 2006/0253885 A1 | 11/2006 | Murphy et al. |
| 2007/0043478 A1 | 2/2007 | Ehlers et al. |
| 2007/0085701 A1 | 4/2007 | Walters et al. |
| 2007/0097993 A1 | 5/2007 | Bojahra et al. |
| 2007/0145915 A1 | 6/2007 | Roberge et al. |
| 2007/0222581 A1 | 9/2007 | Hawkins et al. |
| 2007/0252528 A1* | 11/2007 | Vermuelen et al. ............. 315/34 |
| 2008/0143273 A1 | 6/2008 | Davidson et al. |
| 2008/0147465 A1 | 6/2008 | Raines et al. |
| 2008/0183337 A1 | 7/2008 | Szabados |
| 2008/0218317 A1 | 9/2008 | Choi |
| 2008/0266664 A1 | 10/2008 | Winston et al. |
| 2008/0275802 A1 | 11/2008 | Verfuerth et al. |
| 2008/0291054 A1 | 11/2008 | Groft |
| 2009/0000217 A1 | 1/2009 | Verfuerth et al. |
| 2009/0147507 A1 | 6/2009 | Verfuerth et al. |
| 2009/0150004 A1 | 6/2009 | Wang et al. |
| 2009/0222142 A1 | 9/2009 | Kao et al. |
| 2009/0243517 A1 | 10/2009 | Verfuerth et al. |
| 2009/0248217 A1 | 10/2009 | Verfuerth et al. |
| 2009/0251066 A1 | 10/2009 | Baaijens et al. |
| 2009/0299811 A1 | 12/2009 | Verfuerth et al. |
| 2009/0315485 A1 | 12/2009 | Verfuerth et al. |
| 2010/0061088 A1 | 3/2010 | Bartol et al. |
| 2010/0246168 A1 | 9/2010 | Verfuerth et al. |
| 2011/0060701 A1 | 3/2011 | Verfuerth et al. |
| 2011/0146669 A1 | 6/2011 | Bartol et al. |
| 2011/0235317 A1 | 9/2011 | Verfuerth et al. |
| 2011/0279063 A1 | 11/2011 | Wang et al. |
| 2012/0037725 A1 | 2/2012 | Verfuerth |
| 2012/0038281 A1 | 2/2012 | Verfuerth |
| 2012/0040606 A1 | 2/2012 | Verfuerth |
| 2012/0044350 A1 | 2/2012 | Verfuerth |
| 2012/0081906 A1 | 4/2012 | Verfuerth et al. |
| 2012/0167957 A1 | 7/2012 | Verfuerth et al. |
| 2012/0274222 A1 | 11/2012 | Verfuerth et al. |
| 2013/0006437 A1 | 1/2013 | Verfuerth et al. |
| 2013/0033183 A1 | 2/2013 | Verfuerth et al. |

FOREIGN PATENT DOCUMENTS

| | | |
|---|---|---|
| JP | 05-336868 | 12/1993 |
| JP | 2010-046091 | 3/2010 |
| WO | WO-2004/023849 A1 | 3/2004 |

OTHER PUBLICATIONS

U.S. Appl. No. 13/275,536, filed Oct. 18, 2011, Verfuerth et al.
U.S. Appl. No. 13/296,058, filed Nov. 14, 2011, Verfuerth et al.
U.S. Appl. No. 13/333,293, filed Dec. 21, 2011, Verfuerth et al.
U.S. Appl. No. 61/466,411, filed Mar. 22, 2011, Verfuerth et al.
"About Sun Dome Tubular Skylights," having a date indication of © 2009, 8 pages.
Deru et al.; BigHorn Home Improvement Center Energy Performance; ASHRAE Transactions, Atlanta: 2006 vol. 112, 26 pages.
Halliday, D., et al., Physics Part I and II; John Wiley & Sons, Inc. 1967 (9 pgs.).
Harris, L. R., et al., "Pacific Northwest Laboratory's Lighting Technology Screening Matrix," PNL-SA-23871, Apr. 1994, U.S. Department of Energy, Pacific Northwest Laboratory, Richland, Washington 99352, pp. 1-14.
Notice of Acceptance (NOA) from Miami-Dade County, Building Code Compliance Office, Product Control Division, Approval Date Dec. 13, 2007, 2 pages.
Sun-Dome /Tubular Skylight, Daylighting Technologies, Riviera Beach, FL, revision Oct. 22, 2007, 1 page.
Galasiu et al. "Energy saving lighting control systems for open-plan offices: a filed study"; Jul. 2007, National Research Council Canada; vol. 4; No. 1, pp. 1-28, 56 pages.

\* cited by examiner

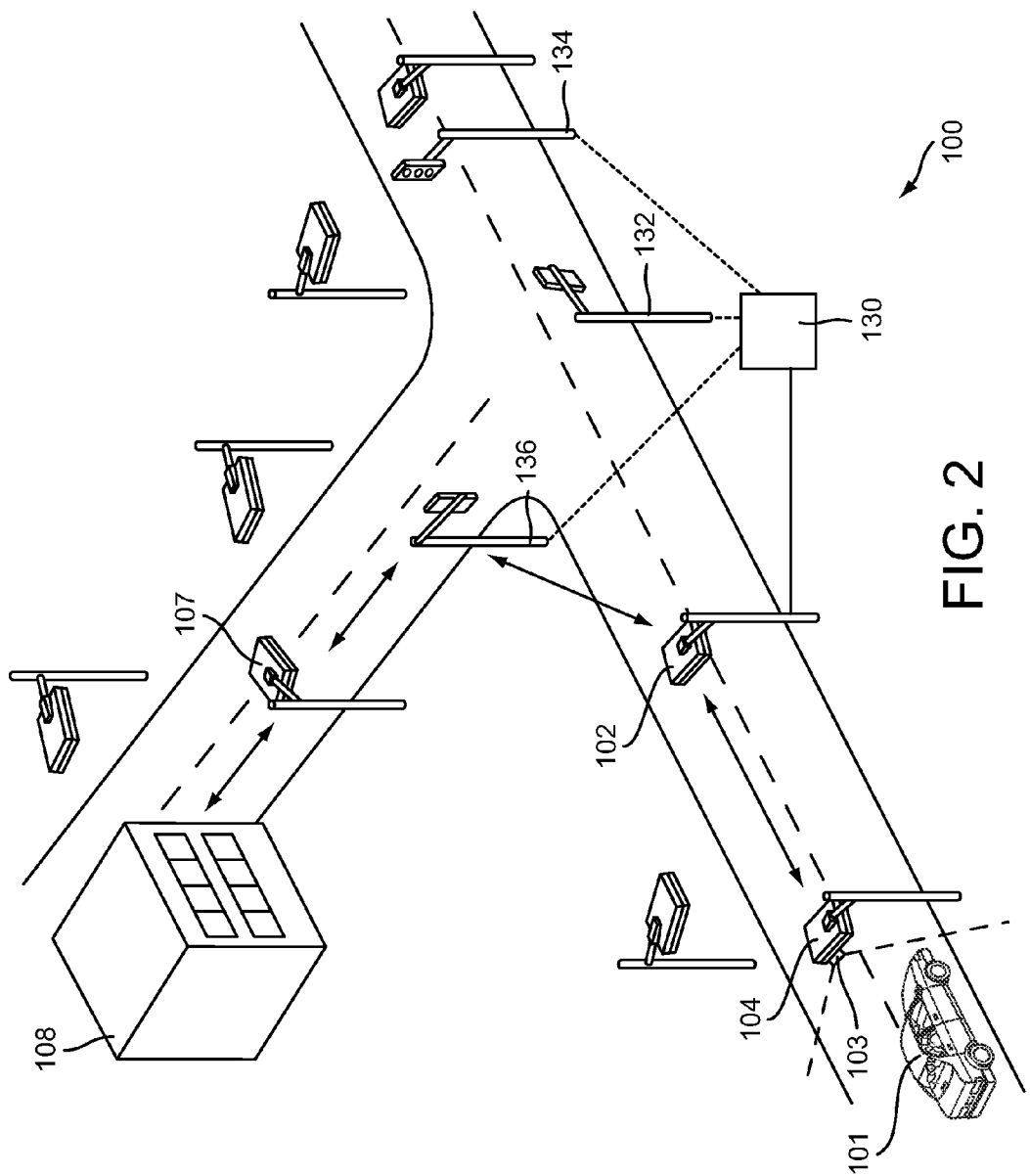

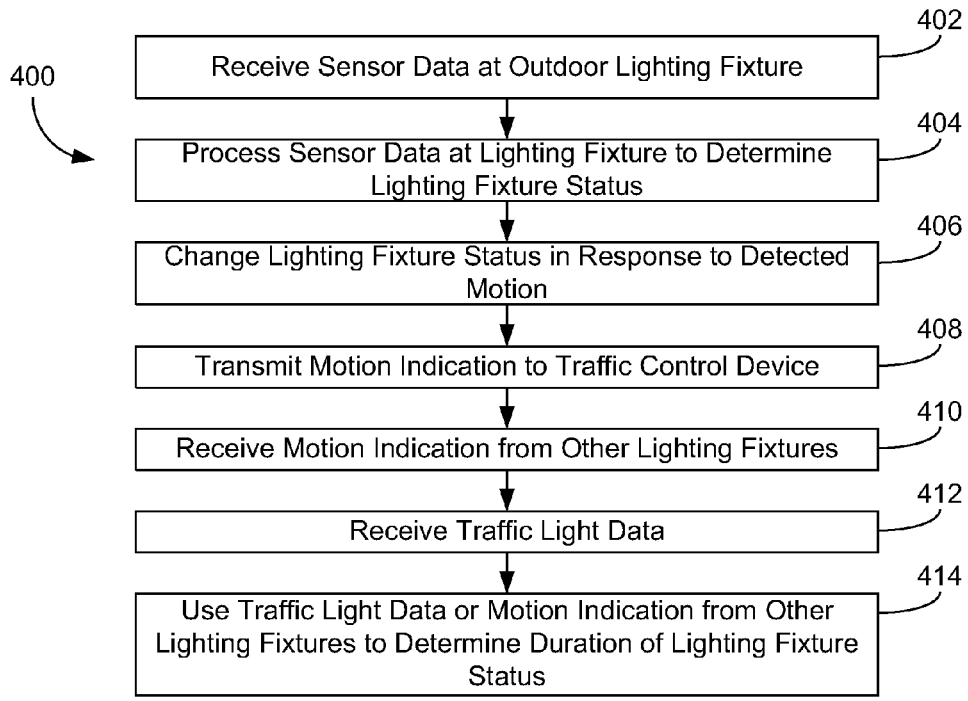
FIG. 4A
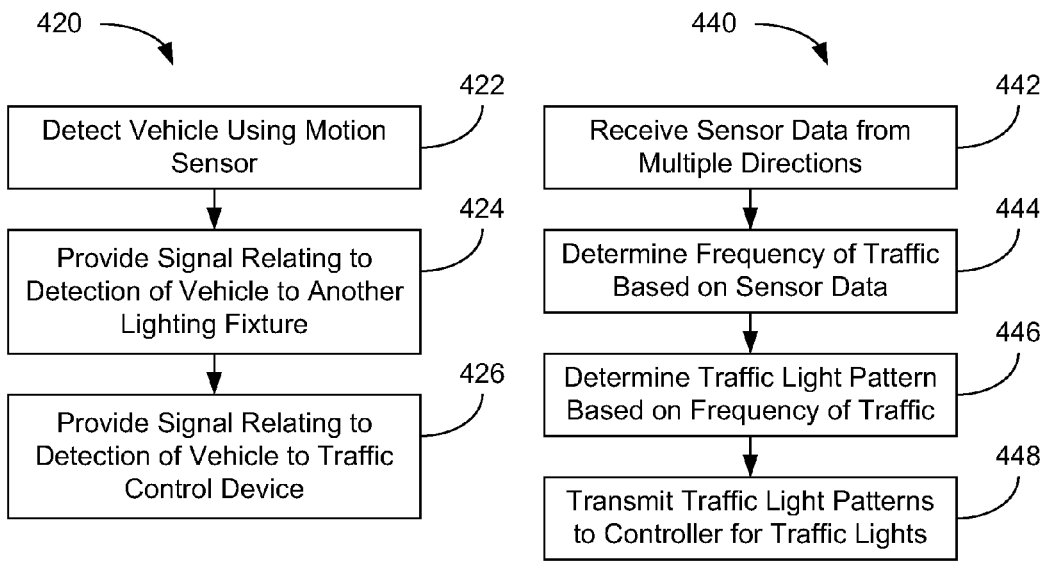
FIG. 4B
FIG. 4C

OUTDOOR LIGHTING FIXTURES FOR CONTROLLING TRAFFIC LIGHTS

CROSS-REFERENCE TO RELATED PATENT APPLICATIONS

This application claims the benefit of priority under 35 U.S.C. §119(e) of U.S. Provisional Application No. 61/380,112, filed on Sep. 3, 2010, and titled "Outdoor Lighting Fixtures for Controlling Traffic Lights." This Application also claims the benefit of priority as a Continuation-In-Part of U.S. application Ser. No. 12/875,930, filed on Sep. 3, 2010, which claims the benefit of priority of U.S. Application No. 61/275,985, filed on Sep. 4, 2009. This Application also claims the benefit of priority as a Continuation-In-Part of U.S. application Ser. No. 12/550,270, filed on Aug. 28, 2009, which is a Continuation-In-Part of application Ser. No. 11/771,317, filed Jun. 29, 2007, and is also a Continuation-In-Part of U.S. Ser. No. 12/240,805, filed on Sep. 29, 2008, which is a Continuation-In-Part of U.S. application Ser. No. 12/057,217, filed Mar. 27, 2008. The subject matter of Application Nos. 61/380,128, 61/275,985, Ser. Nos. 12/875,930, 12/550,270, 12/240,805, 12/057,217, and 11/771,317 are hereby incorporated herein by reference in their entirety.

BACKGROUND

The present invention relates generally to the field of outdoor lighting fixtures. The present invention more particularly relates to the field of outdoor lighting fixtures for controlling traffic lights.

Traffic light systems are used at intersections to control traffic flow. Conventional traffic light systems typically use magnetic strips or radar-based systems for detecting vehicles and managing a traffic light system. Magnetic strip-based traffic light systems can cause premature light changes. Further, magnetic strip-based traffic light systems can fail to account for heavy traffic in one street direction or lane relative to light traffic in another direction or lane. It is challenging and difficult to retrofit traffic control systems or roads with additional magnetic strips or sensors.

SUMMARY

One embodiment of the invention relates to an outdoor lighting fixture for communicating with a traffic light system. The outdoor lighting fixture includes a ballast for providing current to at least one lamp and a fixture housing at least partially surrounding the ballast and the at least one lamp. The outdoor lighting fixture further includes a mount configured to hold the fixture housing to a pole and a control circuit wired to the ballast. The outdoor lighting fixture yet further includes a sensor wired to the control circuit and a radio frequency transceiver wired to the control circuit. The control circuit is configured to process inputs from the sensor to determine whether to send a light change instruction to the traffic system via the radio frequency transceiver. In some embodiments the control circuit may assign a priority to the light change instruction and send a representation of the priority to the traffic system with the light change instruction.

Another embodiment of the invention relates to a method for changing a traffic light controlled by a traffic light control system. The method includes sensing motion in an area using a sensor mounted to an outdoor lighting fixture and transmitting a radio frequency message representing the sensed motion from the outdoor lighting fixture to the traffic light control system. The method may further include receiving, at the traffic light system, radio frequency messages from a plurality of outdoor lighting fixtures, the radio frequency messages representing motion from a plurality of directions at an intersection. The method may further include aggregating, at the traffic light system, a motion count from outdoor lighting fixtures associated with each of the plurality of directions at the intersection. The method may yet further include using a control circuit of the traffic light system to determine which of the plurality of directions at the intersection to stop and which of the plurality of directions at the intersection to command to proceed via a traffic light change. The method can yet further include determining a duration for the traffic light change based on the motion count from outdoor lighting fixtures associated with each of the plurality of directions at the intersection.

Another embodiment of the invention relates to a system for controlling a traffic light at an intersection of a first street and a second street. The system includes a first street light oriented to illuminate the first street and having a first motion sensor pointed to detect vehicle traffic on the first street. The system further includes a second street light oriented to illuminate the second street and having a second motion sensor pointed to detect vehicle traffic on the second street. The system also includes a command system for the traffic light. The first street light and the second street light communicate detected vehicle traffic on the first street and the second street to the command system via radio frequency transceivers of the first street light and the second street light. The command system changes the traffic light based on the detected vehicle traffic on the first street and the second street. The command system may be configured to compare the detected vehicle traffic on the first street and the second street to determine a precedence for the traffic light change. Further, the command system can use the comparison of detected vehicle traffic to determine a duration for the traffic light change.

Yet another embodiment of the invention relates to a network of outdoor lighting fixtures. The network includes a first outdoor lighting fixture having a motion sensor and configured to detect vehicle traffic on a street using signals from the motion sensor. The first outdoor lighting fixture also has a first radio frequency transceiver. The network further includes a second outdoor lighting fixture having a second radio frequency transceiver. The first outdoor lighting fixture is configured to cause the first radio frequency transceiver to transmit an indication of detected vehicle traffic to the second radio frequency transceiver. The second outdoor lighting fixture is configured to provide the indication of detected vehicle traffic to at least one of another outdoor lighting fixture and a traffic light system. The first outdoor lighting fixture may be configured to brighten in response to detected vehicle traffic. The second outdoor lighting fixture may be configured to brighten in response to receiving the indication of detected vehicle traffic.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which:

FIG. 2 is an environment view of an intersection including a lighting fixture system and traffic light control system, according to an exemplary embodiment;

FIG. 4A is a flow chart of a process for operating an outdoor lighting fixture with a traffic control device, according to an exemplary embodiment;

FIG. 4B is a flow chart of a process for using a lighting fixture sensor to update a traffic light status, according to an exemplary embodiment;

FIG. 4C is a flow chart of a process for using multiple lighting fixture sensors to determine a traffic light pattern, according to an exemplary embodiment;

DETAILED DESCRIPTION

Referring generally to the Figures, outdoor lighting fixtures for communicating with traffic lights and traffic light systems are shown, according to an exemplary embodiment. The outdoor lighting fixtures include a sensor wired to a control circuit of the outdoor lighting fixture and a radio frequency transceiver. The control circuit is configured to process inputs from the sensor to determine whether to send a light change instruction to the traffic system via the radio frequency transceiver. In some embodiments the control circuit may assign a priority or duration to the light change instruction in response to the sensor inputs.

Figure 1:
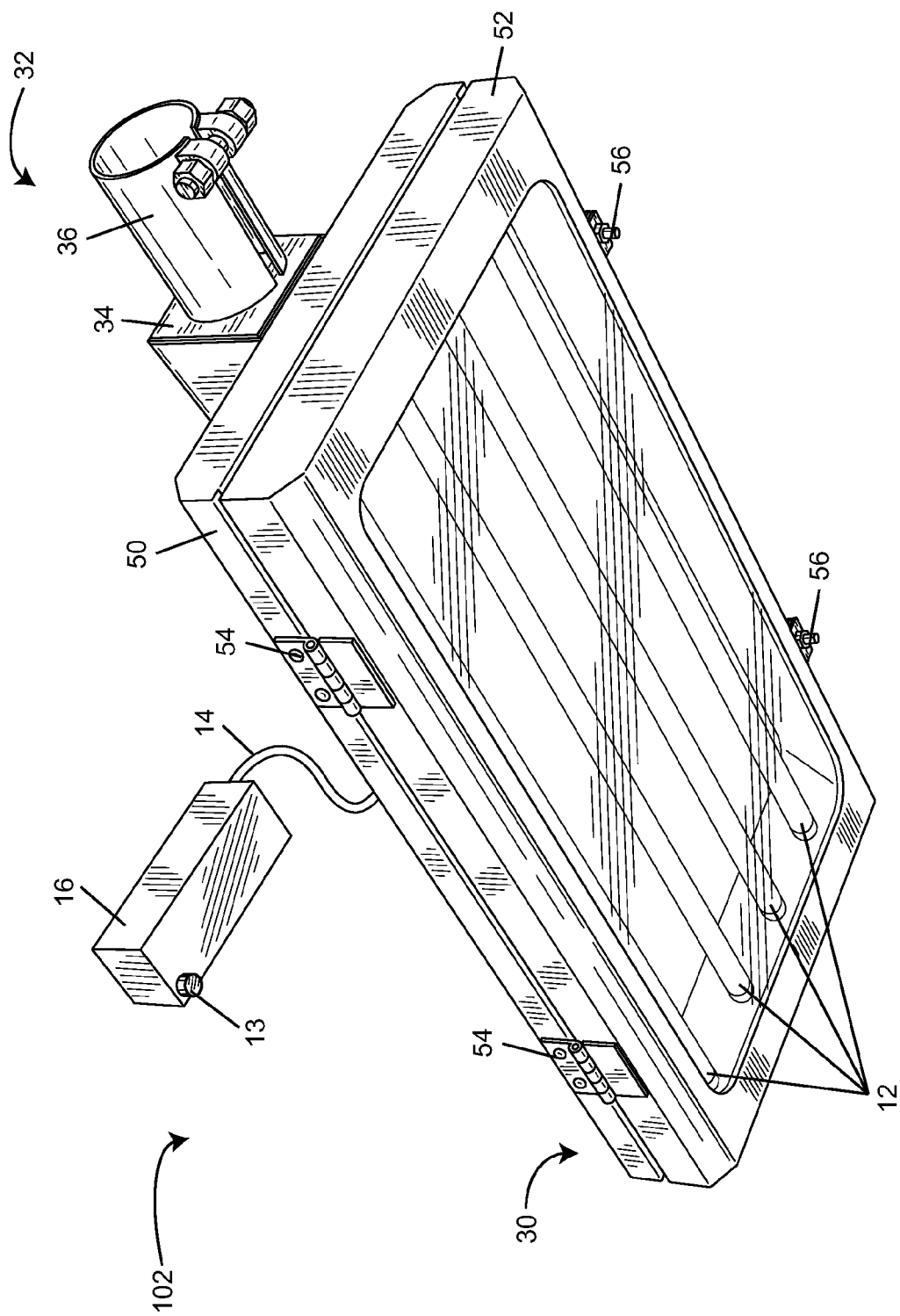
FIG. 1 is a bottom perspective view of an outdoor fluorescent lighting fixture, according to an exemplary embodiment.

Referring now to FIG. 1, a bottom perspective view of an outdoor fluorescent lighting fixture 102 that can be used with the systems and methods of the present disclosure is shown, according to an exemplary embodiment. Outdoor fluorescent lighting fixture 102 is configured for applications such as a street lighting application or a parking lot lighting application. In some embodiments, outdoor fluorescent lighting fixture 102 includes a mounting system 32 for coupling fluorescent lighting fixture 102 to high poles or masts (e.g., high poles for holding street lights, high poles for holding parking lot lights, etc). Outdoor fluorescent lighting fixture 102 may also be configured to provide wired or wireless communications capabilities, one or more control algorithms (e.g., based on sensor feedback, received wireless commands or wireless messages, etc.), built-in redundancy, and venting. Many of the outdoor lighting fixtures described herein may advantageously mount to existing street light poles or other outdoor structures for holding lighting fixtures such that no modification to the existing infrastructure (other than replacing the lighting fixture itself) is necessary. In some embodiments, the outdoor lighting fixtures include control circuits for providing energy saving control features to a group of lighting fixtures or a municipality without changing existing power wiring run from pole to pole. While many of the embodiments described herein are of a fluorescent lighting fixture, in other embodiments the lighting fixture may be configured for illuminating an area using other lamp technologies.

In FIG. 1, outdoor lighting fixture 102 is shown by way of example as configured for coupling to a pole and for directing toward the ground. Such an orientation may be used to illuminate streets, sidewalks, bridges, parking lots, and other outdoor areas where ground illumination is desirable. Outdoor lighting fixture 102 is shown to include a mounting system 32 and a housing 30. Mounting system 32 is configured to mount fixture 102 including housing 30 to a pole or mast. In an exemplary embodiment, housing 30 surrounds one or more fluorescent lamps 12 (e.g., fluorescent tubes) and includes a lens (e.g., a plastic sheet, a glass sheet, etc.) that allows light from the one or more fluorescent lamps 12 to be provided from housing 30.

Mounting system 32 is shown to include a mount 34 and a compression sleeve 36. Compression sleeve 36 is configured to receive the pole and to tighten around the pole (e.g., when a clamp is closed, when a bolt is tightened, etc.). Compression sleeve 36 may be sized and shaped for attachment to existing outdoor poles such as street light poles, sidewalk poles, parking lot poles, and the like. As is provided by mounting system 32, the coupling mechanism may be mechanically adaptable to different poles or masts. For example, compression sleeve 36 may include a taper or a tapered cut so that compression sleeve 36 need not match the exact diameter of the pole or mast to which it will be coupled. While lighting fixture 102 shown in FIG. 1 utilizes a compression sleeve 36 for the mechanism for coupling the mounting system to a pole or mast, other coupling mechanisms may alternatively be used (e.g., a two-piece clamp, one or more arms that bolt to the pole, etc.).

According to an exemplary embodiment, fixture 102 and housing 30 are elongated and mount 34 extends along the length of housing 30. Mount 34 is preferably secured to housing 30 in at least one location beyond a lengthwise center point and at least one location before the lengthwise center point. In other exemplary embodiments, the axis of compression sleeve 36 also extends along the length of housing 30. In the embodiment shown in FIG. 1, compression sleeve 36 is coupled to one end of mount 34 near a lengthwise end of housing 30.

Housing 30 is shown to include a fixture pan 50 and a door frame 52 that mates with fixture pan 50. In the embodiments shown in the Figures, door frame 52 is mounted to fixture pan 50 via hinges 54 and latches 56. When latches 56 are released, door frame 52 swings away from fixture pan 50 to allow access to fluorescent bulbs 12 within housing 30. Latches 56 are shown as compression-type latches, although many alternative locking or latching mechanisms may be alternatively or additionally provided to secure the different sections of the housing. In some embodiments the latches may be similar to those found on "NEMA 4" type junction boxes or other closures. Further, many different hinge mechanisms may be used. Yet further, in some embodiments door frame 52 and fixture pan 50 may not be joined by a hinge and may be secured together via latches 56 on all sides, any number of screws, bolts or other fasteners that do not allow hinging, or the like. In an exemplary embodiment, fixture pan 50 and door frame 52 are configured to sandwich a rubber gasket that provides some sealing of the interior of housing 30 from the outside environment. In some embodiments the entirety of the interior of the lighting fixture is sealed such that rain and other environmental moisture does not easily enter housing 30. Housing 30 and its component pieces may be galvanized steel but may be any other metal (e.g., aluminum), plastic, and/or composite material. Housing 30, mounting system 32 and/or the other metal structures of lighting fixture 102 may be powder coated or otherwise treated for durability of the metal. According to an exemplary embodiment housing 30 is powder coated on the interior and exterior surfaces to provide a hard, relatively abrasion resistant, and tough surface finish.

Housing 30, mounting system 32, compression sleeve 36, and the entirety of lighting fixture 102 are preferably extremely robust and able to withstand environmental abuses of outdoor lighting fixtures. The shape of housing 30 and mounting system 32 are preferably such that the effective projection area (EPA) relative to strong horizontal winds is minimized—which correspondingly provides for minimized wind loading parameters of the lighting fixture.

Ballasts, structures for holding lamps, and the lamps themselves may be installed to the interior of fixture pan 50. Further, a reflector may be installed between the lamp and the interior metal of fixture pan 50. The reflector may be of a defined geometry and coated with a white reflective thermosetting powder coating applied to the light reflecting side of the body (i.e., a side of the reflector body that faces toward a fluorescent light bulb). The white reflective coating may have reflective properties, which in combination with the defined geometry of the reflector, provides high reflectivity. The reflective coating may be as described in U.S. Prov. Pat. App. No. 61/165,397, filed Mar. 31, 2009. In other exemplary embodiments, different reflector geometries may be used and the reflector may be uncoated or coated with other coating materials. In yet other embodiments, the reflector may be a "MIRO 4" type reflector manufactured and sold by Alanod GmbH & Co KG.

The shape and orientation of housing 30 relative to the reflector and/or the lamps is configured to provide a full cut off such that light does not project above the plane of fixture pan 50. The lighting fixtures described herein are preferably "dark-sky" compliant or friendly.

To provide further resistance to environmental variables such as moisture, housing 30 may include one or more vents configured to allow moisture and air to escape housing 30 while not allowing moisture to enter housing 30. Moisture may enter enclosed lighting fixtures due to vacuums that can form during hot/cold cycling of the lamps. According to an exemplary embodiment, the vents include, are covered by, or are in front of one or more pieces of material that provide oleophobic and hydrophobic protection from water, washing products, dirt, dust and other air contaminants. According to an exemplary embodiment the vents may include GORE membrane sold and manufactured by W.L. Gore & Associates, Inc. The vent may include a hole in the body of housing 30 that is plugged with a snap-fit (or otherwise fit) plug including an expanded polytetrafluoroethylene (ePTFE) membrane with a polyester non-woven backing material.

Referring still to FIG. 1, lighting fixture 102 is shown to include a housing 30 (e.g., frame, fixture pan, etc.) within which fluorescent lamps 12 are housed. While various Figures of the present disclosure, including FIG. 1, illustrate lighting fixtures for fluorescent lamps, it should be noted that embodiments of the present disclosure may be utilized with any type of lighting fixture and/or lamps. Further, while housing 30 is shown as being fully enclosed (e.g., having a door and window covering the underside of the fixture), it should be noted that any variety of lighting fixture shapes, styles, or types may be utilized with embodiments of the present application. Further, while controller 16 is shown as having a housing that is exterior to housing 30 of lighting fixture 102, it should be appreciated that controller 16 may be physically integrated with housing 30. For example, one or more circuit boards or circuit elements of controller 16 may be housed within, on top of, or otherwise secured to housing 30. In other exemplary embodiments, controller 16 (including its housing) may be coupled directly to housing 30. For example, controller 16's housing may be latched, bolted, clipped, or otherwise coupled to the interior or exterior of housing 30. Controller 16's housing may generally be shaped as a rectangle (as shown), may include one or more non-right angles or curves, or otherwise configured. In an exemplary embodiment, controller 16's housing is made of plastic and housing 30 for the lighting fixture 102 is made from metal. In other embodiments, other suitable materials may be used.

Controller 16 is shown as connected to lighting fixture 102 via wire 14. Controller 16 is configured to control the switching between different states of lighting fixture 102 (e.g., all lamps on, all lamps off, some lamps on, a lamps dimmed state, a fully-illuminated state, etc.). According to various embodiments, controller 16 is further configured to log usage information for lighting fixture 102 in a memory device local to controller 16 via wire 14. Controller 16 may further be configured to use the logged usage information to affect control logic of controller 16. Controller 16 may also or alternatively be configured to provide the logged usage information to another device for processing, storage, or display. Controller 16 is shown to include a sensor 13 coupled to controller 16 (e.g., controller 16's exterior housing). Controller 16 may be configured to use signals received from sensor 13 to affect control logic of controller 16. Further, controller 16 may be configured to provide sensor data from sensor 13 to another device (e.g., a traffic light, another lighting fixture, etc.). Sensor 13 may be an occupancy sensor, a motion sensor, a photocell, an infrared sensor, a sonic sensor, an ultrasonic sensor, an microwave sensor, or any other type of sensor for supporting the activities herein.

Referring now to FIG. 2, an environmental view of an intersection 100 including traffic lights and outdoor lighting fixtures is shown, according to an exemplary embodiment. The area around intersection 100 is shown to include multiple lighting fixtures 102, 104 and other lighting fixtures and traffic lights 132, 134, 136. One or more of the outdoor lighting fixtures (e.g., fixtures 102, 104) shown in FIG. 2 are used to manage the nearby traffic lights. An outdoor lighting fixture can provide traffic light commands or other data such as sensor data to traffic control device 130 or directly to one or more of traffic lights 132, 134, 136. One or more of the outdoor lighting fixtures can also receive data from the traffic control device 130, traffic lights 132, 134, 136, or other outdoor lighting fixtures.

Outdoor lighting fixture 104 uses sensor 103 for detecting motion. In FIG. 2, sensor 103 (e.g., a motion sensor, a sensor of the technology described with reference to sensor 13, etc.) is shown as detecting the motion of vehicle 101. The outdoor lighting fixture system of FIG. 2 can include additional outdoor lighting fixtures with sensors. A control circuit of outdoor lighting fixture 104 may collect data from sensor 103 and/or other sensors of the other outdoor lighting fixtures. Using the collected data, the control circuit is configured to make determinations such as whether or not motion exists on a street, whether or not one or more vehicles are present on the street, how long a vehicle or vehicles has been waiting at a stop light, the speed of a vehicle, the location of a vehicle, the direction of travel of the vehicle, and the like.

In FIG. 2, outdoor lighting fixture 104 is shown as wirelessly communicating with lighting fixture 102. Outdoor lighting fixture 104 can provide a control circuit of lighting fixture 102 with commands or information (e.g., sensor data, an indication of motion determined using sensor data, etc.) for traffic control device 130 or for traffic lights 132, 134, 136 via wireless communication. Outdoor lighting fixture 102 (or one or more other outdoor lighting fixtures) is shown to include a wired connection with traffic control device 130. Lighting fixture 102 may provide traffic control device 130 with traffic light commands based on commands or information received wirelessly from, e.g., outdoor lighting fixture 104. In other exemplary embodiments outdoor lighting fixture 102 can communicate (e.g., wirelessly, via a wired connection) directly with a traffic light (e.g., traffic light 136).

Traffic control device 130 is shown to include a wired connection with each traffic light (e.g., lights 132, 134, 136) of the traffic light control system. In other embodiments the communication between traffic control device 130 and traffic lights 132, 134, 136 is wireless. Traffic control device 130 uses commands and information generated by outdoor lighting fixtures or other sources (e.g., a master controller in building 108) to determine how to operate traffic lights 132, 136, and 134. For example, traffic control device 130 may receive an indication of motion relating to vehicle 101 from outdoor lighting fixture 102. The indication of motion may have originated from outdoor lighting fixture 104 and based on sensor outputs from sensor 103. Traffic control device 130 may respond to the receipt of the indication of motion by causing traffic light 134 to turn green and for traffic light 132 to turn red. Traffic control device 130 can determine whether to immediately switch the traffic lights, can determine a new order for the traffic lights, can determine a new timing for the traffic lights, or can make other traffic light pattern determinations based on information received from outdoor lighting fixtures and the outdoor lighting fixtures' motion sensors.

Traffic control device 130 may include logic for determining a future state for traffic lights 132, 134, 136 if sensors of outdoor lighting fixtures detect multiple vehicles traveling towards intersection 100 or waiting at intersection 100. The decision of a future state for an intersection may be based upon new data from nearby outdoor lighting fixtures as well as historical data for the intersection (e.g., traffic patterns and frequency—if one road is usually busier than the other road, the lights for that road may turn "green" for longer in response to motion).

According to an exemplary embodiment, traffic control device 130 may be in communication with other intersections as well as intersection 100. For example, traffic control device 130 can transmit data to a downstream traffic light after traffic control device 130 determines that it should turn a traffic light green. Further, traffic control device 130 can receive data from other intersections (e.g., other outdoor lighting fixtures at other intersections, other traffic control devices, other individual traffic lights, etc.) and for making local decisions. Commands or other information may be transmitted between intersections using a network of outdoor lighting fixtures. As shown in FIG. 2, wireless transmissions may be relayed from one outdoor lighting fixture to the next. Some of the "hops" between outdoor lighting fixtures may be wired and some may be wireless. Further, multiple traffic control devices can use the wireless network provided by the outdoor lighting fixtures to communicate. For example, there may be five outdoor lighting fixtures between a vehicle traveling towards intersection 100 and intersection 100, and a sensor on the outdoor lighting fixture farthest away from intersection 100 may detect the vehicle. The sensor data (or an indication of motion generated based on the sensor data) may then be retransmitted by each outdoor lighting fixture on the way to an appropriate traffic control device. Each control circuit of each outdoor lighting fixture that receives the sensor data can use the sensor data to determine a lighting fixture status. For example, as an indication of motion is transmitted from outdoor lighting fixture to outdoor lighting fixture and toward an intersection's traffic control device, each outdoor lighting fixture may switch from a dimmed state to a fully illuminated state—lighting the road in front of the car and turning the traffic light green in advance of the car arriving at the intersection.

Referring further to FIG. 2, according to an exemplary embodiment, outdoor lighting fixture 104 may include a control circuit configured to use sensor 103 to detect an emergency vehicle approaching the fixture or the nearby intersection. For example, sensor 103 can be a microphone rather than a motion sensor and the control circuit of outdoor lighting fixture can distinguish a siren from regular traffic noise (e.g., by detecting a particular frequency, pattern, and/or amplitude). Once a siren is distinguished, the outdoor lighting fixture 104 can override any previously determined schedule for the intersection by sending messages to outdoor lighting fixture 102 and/or traffic control device 130 regarding the approaching emergency vehicle. In other exemplary embodiments the sensor 130 is a light sensor configured to detect the flashing lights of an emergency vehicle as it approaches the fixture 104. In yet other embodiments a microphone may be provided to the outdoor lighting fixture in addition to a motion sensor or optical sensor. Upon detection of an approaching emergency vehicle the outdoor lighting fixture can immediately "blast" a message reporting the approaching emergency vehicle to a plurality of upcoming traffic lights, traffic control devices, or intersections to ensure that the road in front of the emergency vehicle is as clear as possible. The emergency vehicle activity described in this paragraph may co-exist with or may be provided separately from the other traffic control activities described herein.

Figure 3A:
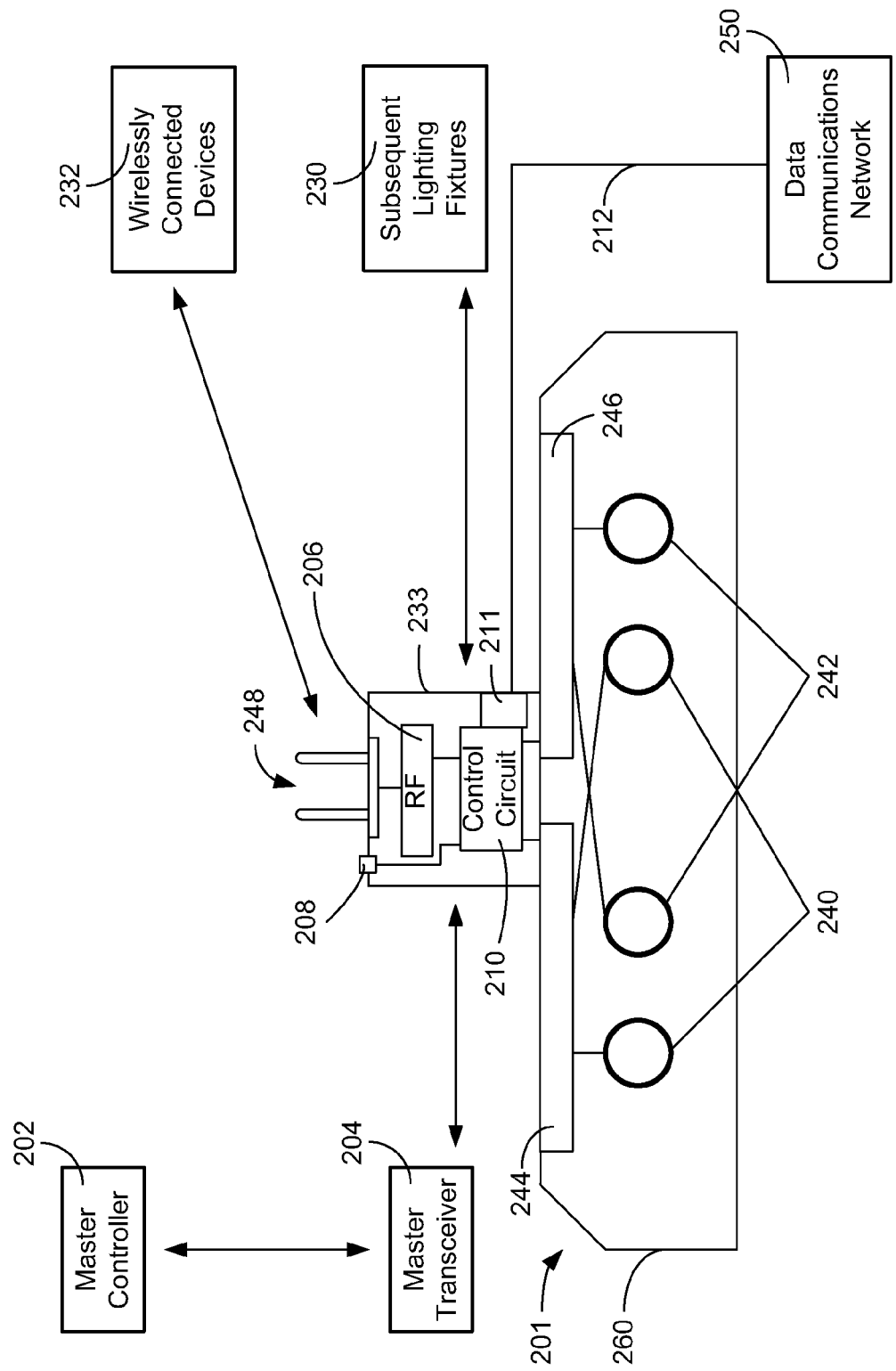
FIG. 3A is a diagram of an outdoor lighting fixture that may be used with the lighting fixture system and traffic light control system of FIG. 2, according to an exemplary embodiment.

FIG. 3A is a diagram of another outdoor lighting fixture 201, according to an exemplary embodiment. Outdoor lighting fixture 201 is shown to include housing 260 and mounting system 233. Electronics for outdoor lighting fixture 201 are shown inside mounting system 233. The electronics may be user-accessible via an opening in the top of mounting system 233. The diagram shown in FIG. 3A illustrates two lamp sets 240, 242 with two fluorescent lamps forming each lamp set 240, 242. Each lamp set 240, 242 may include one or any number of additional fluorescent lamps. Further, while some embodiments described herein relate to providing redundant lamp sets and ballasts, it should be appreciated that many embodiments of the present disclosure may only include a single lamp set and a single ballast. In other embodiments more than two ballasts and lamp sets may be included in a single lighting fixture. While the fluorescent lamps are illustrated as tube lamps extending lengthwise relative to the lighting fixture, the fluorescent lamps may be compact fluorescent bulbs, run perpendicular to the length of the lighting fixture, or may be otherwise oriented.

Referring still to FIG. 3A, mounting system 233 is shown to include a control circuit 210 and a radio frequency transceiver 206. Control circuit 210 is coupled to ballasts 244, 246 and is configured to provide control signals to ballasts 244, 246. Control circuit 210 may be coupled to a relay or relays so that control circuit 210 controllably switches the relay between providing power to ballasts 244, 246 and restricting power to ballasts 244, 246. Radio frequency transceiver 206 is communicably connected to control circuit 210. According to an exemplary embodiment, outdoor lighting fixture 201 is configured to receive control signals from a master controller 202 via master transceiver 204 and radio frequency transceiver 206. Outdoor lighting fixture 201 is also configured to provide information to one or more remote sources such as wirelessly connected devices 232 and subsequent lighting fixtures 230 via radio frequency transceiver 206. Wirelessly connected devices 232 can include traffic control devices or traffic lights such as those shown in FIG. 2. Radio frequency transceiver 206 may also be configured to serve as a WiFi transceiver configured to serve as a wireless access point.

Outdoor lighting fixture 201 is further shown to include a wired interface 211. Wired interface 211 may be or include a wire terminal, hardware for interpreting analog or digital signals received at the wire terminal, or one or more jacks, connectors, plugs, filters, or other hardware (or software) for receiving and interpreting signals received via wire 212 from a remote source (e.g., a data communications network 250). Wired interface 211 may be an interface to a communications network (e.g., a WAN, the Internet, etc.) or may be an interface to a particular device (e.g., a traffic control device, a traffic light, etc.). In embodiments where wired interface 211 is an interface to a communications network, the outdoor lighting fixture can use the communications network to reach a traffic control device or a traffic light.

Radio frequency transceiver 206 may include an encoder, a modulator, an amplifier, a demodulator, a decoder, an antenna, one or more filters, one or more buffers, one or more logic modules for interpreting received transmissions, and/or one or more logic modules for appropriately formatting transmissions. In addition to radio frequency transceiver 206, outdoor lighting fixture 201 is shown to include antennas 248 for use by radio frequency transceiver 206.

The radio frequency transceiver 206 and the control circuit 210 of FIG. 3A are shown as being entirely enclosed within the mounting system 233 and relatively closely coupled. In other embodiments, however, the circuit may be distributed (e.g., having some components outside of the mounting system 233, having some components within the fixture housing 260, etc.). The radio frequency transceiver 206 and the control circuit 210 may be implemented on a single PCB, a flexible PCB, separate PCB's but closely coupled, apart from any PCB, connected via wires, or otherwise.

FIG. 3A is further shown to include an environment sensor 208. Environment sensor 208 is shown as located at the top of mounting system 233. In other embodiments, the environment sensor 208 may be installed within housing 260, to the underside of housing 260, or to any other part of outdoor lighting fixture 201. In yet other embodiments, environment sensor 208 may be remote from the fixture itself (e.g., coupled to a lower location on the pole, coupled to a street sign, coupled to a stop light, etc.). It should further be mentioned that one environment sensor 208 may serve multiple outdoor lighting fixtures. This may be accomplished by the environment sensor 208 providing output signals (e.g., wireless output signals) directly to multiple outdoor lighting fixtures or by the environment sensor 208 providing output signals to a single outdoor lighting fixture (via a wired or wireless connection), where the single outdoor lighting fixture is configured to forward the sensor's signals (or a representation or message derived from the signals) to other outdoor lighting fixtures or to a master controller 204 for action.

As mentioned above, environment sensor 208 may be a motion sensor configured to detect vehicle presence or movement in the area around outdoor lighting fixture 201. The sensor data may be sent to subsequent outdoor lighting fixtures 230 or to wirelessly connected devices 232 (e.g., traffic control devices, traffic lights, etc.) via radio frequency transceiver 206 or wired link 212. Control circuit 210 is coupled (e.g., via a wired connection) to environment sensor 208 is configured to cause lamps 240, 242 to illuminate when movement is detected (or based on some other logic determination using sensor input). Control circuit 210 may also be configured to turn the lighting fixture on for a period of time prior to turning the lighting fixture off if no further occupancy is detected.

Figure 3B:
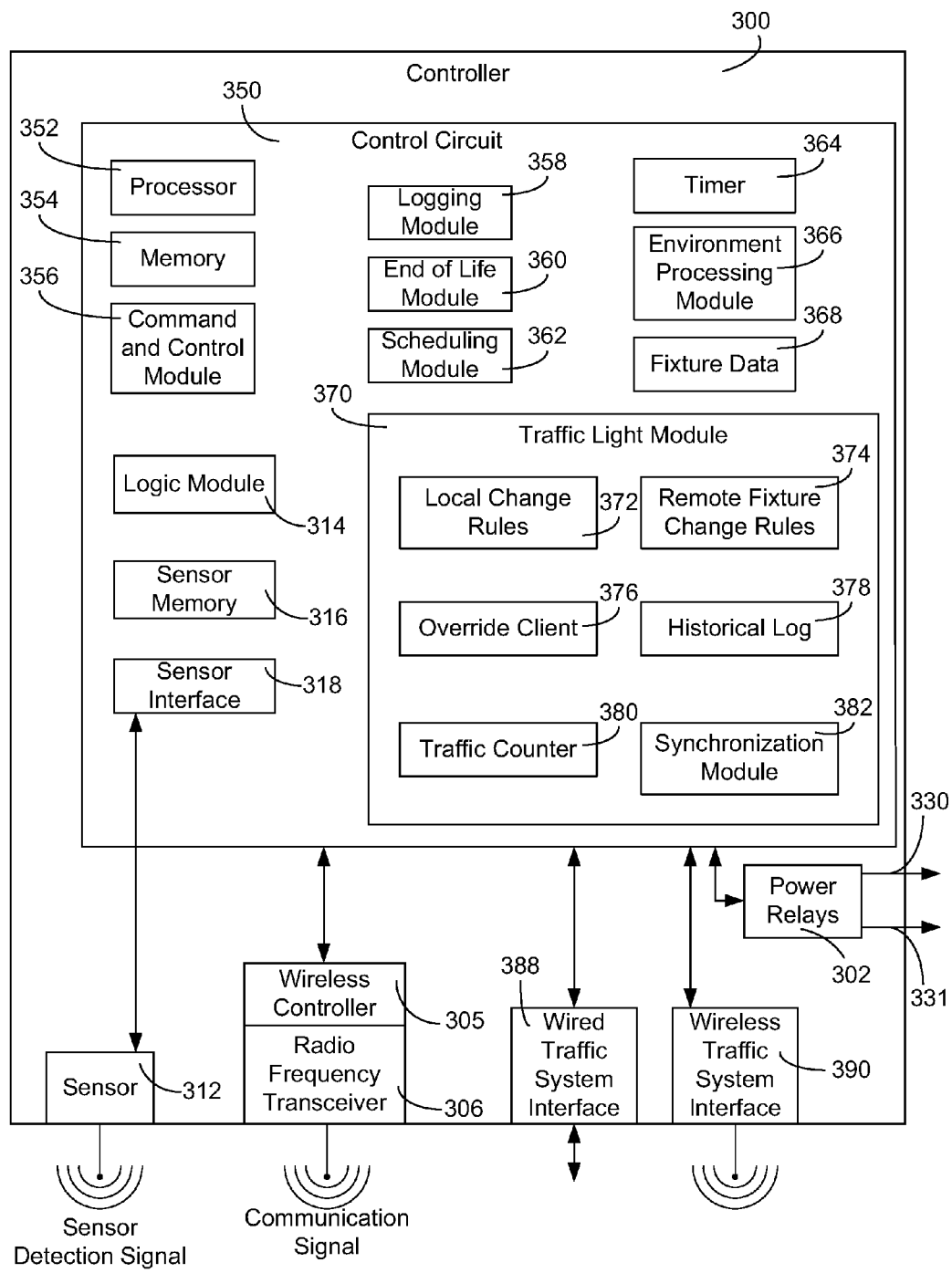
FIG. 3B is a block diagram of a lighting fixture controller and circuit, according to an exemplary embodiment.

Referring now to FIG. 3B, a block diagram of a controller 300 including a control circuit 350 (e.g., a control circuit such as the control circuit 210 of FIG. 3A) is shown, according to an exemplary embodiment. Controller 300 and control circuit 350 may be an outdoor lighting fixture controller and control circuit for any of the outdoor lighting fixtures shown or described herein.

In some embodiments, activities of circuit 350 are controlled or facilitated using one or more processors 352 (e.g., a programmable integrated circuit, a field programmable gate array, an application specific integrated circuit, a general purpose processor, a processor configured to execute instructions it receives from memory, etc.). In other embodiments, activities of circuit 350 are controlled and facilitated without the use of one or more processors and are implemented via a circuit of analog and/or digital electronics components. Memory 354 of circuit 350 may be computer memory, semiconductor-based, volatile, non-volatile, random access memory, flash memory, magnetic core memory, or any other suitable memory for storing information.

Circuit 350 is further shown to include a radio frequency (RF) transceiver 306. In an alternative embodiment, RF transceiver 306 may be integrated with circuit 350 rather than being separate as shown in FIG. 3B. In the present disclosure, the term transceiver may refer to an integrated transmitter and receiver pair or a separate transmitter and receiver.

Circuit 350 further includes a sensor interface 318 that is configured to receive signals from environment sensor 312. Sensor interface 318 may include any number of jacks, terminals, solder points or other connectors for receiving a wire or lead from environment sensor 312. Sensor interface 318 may also or alternatively be a radio frequency transceiver or receiver for receiving signals from wireless sensors. For example, sensor interface 318 may be a Bluetooth protocol compatible transceiver, a ZigBee transceiver, or any other standard or proprietary transceiver. Regardless of the communication medium used, sensor interface 318 may include filters, analog to digital converters, buffers, or other components configured to handle signals received from environment sensor 312. Sensor interface 318 may be configured to provide the result of any signal transformation (or the raw signal) to circuit 350 for further processing.

Circuit 350 is further shown to include a command and control module 356, logging module 358, an end of life module 360, a scheduling module 362, a timer 364, an environment processing module 366, and fixture data 368. Using signals received from communications electronics of the lighting fixture and/or signals received from one or more sensors (e.g., photocells, occupancy sensors, etc.), command and control module 356 is configured to control the ballasts and lamps of the fixture. Command and control module 356 may include the primary control algorithm/loop for operating the fixture and may call, initiate, pass values to, receive values from, or otherwise use the other modules of control circuit 350. For example, command and control module 356 may primarily operate the fixture using a schedule as described below with respect to scheduling module 362, but may allow upstream or peer control (e.g., "override control") to allow a remote source to cause the ballast/lamps to turn on or off. Command and control module 356 may be used to control 2-way communication by providing commands to wireless controller 305 and/or radio frequency transceiver 306.

Logging module 358 is configured to identify and store fixture event information. For example, logging module 358 may be configured to identify (e.g., by receiving a signal from another component of the circuit) when the lamps of the fixture are being or have been turned off or turned on. These events may be recorded by logging module 358 with a date/time stamp and/or with other event data. For example, logging module 358 may record each event as a row in a two dimensional table (e.g., implemented as a part of a relational database, implemented as a flat file stored in memory, etc.) with fields such as event name, event date/time, event cause, event source. One module that may utilize such information is end of life module 360. End of life module 360 may be configured to compile a time of use total by querying or otherwise aggregating the data stored by logging module 358. Events logged by the system may be transmitted to a remote source using the RF transceiver 306 or other communications electronics. Messages describing logged events or data may include an identifier unique to the outdoor lighting fixture (e.g., an address for the radio frequency transceiver, a lighting fixture serial number, etc.) that identify the fixture specifically. Command and control module 356 may be configured to cause communications electronics of the fixture to transmit messages from the log or other messages upon identifying a failure (e.g., a power supply failure, a control system failure, a ballast failure, a lamp failure, etc.). While logging module 358 may be primarily used to log on/off events, logging module 358 (or another module of the control system) may log energy draw (or some value derived from energy draw such as a carbon equivalent amount) by the lighting fixture.

FIG. 3B is further shown to include a scheduling module 362. Scheduling module 362 may be used by the control circuit 350 to determine when the lamps of the lighting fixture should be turned on or off. Scheduling module 362 may only consider time, or may also consider inputs received from environment sensor 312 (e.g., indicating that it is night out and that artificial light is necessary) or inputs received from a remote source (e.g., via RF transceiver 306, via wired traffic system interface 388, via wireless traffic system interface 390, etc.). Scheduling module 362 may access a schedule stored in memory 354 of the control circuit 350 to carry out its tasks. In some embodiments schedule data may be user-updatable via a remote source and transmitted to the fixture via RF transceiver 306. While end of life module 360 may utilize an actual log of fixture events as described in the previous paragraph, in some embodiments end of life module 360 may utilize scheduling information to make an end of life determination. In yet other embodiments, logging module 358 may receive data from scheduling module 362 to create its log. Controller 300 and control circuit 350 are further shown to include a timer 364 that may be used by control circuit 350 to maintain a date/time for use by or for checking against information of scheduling module 362, end of life module 360, or logging module 358. Environment processing module 366 may be configured to process signals received from one or more sensors such as environment sensor 312. Environment processing module 366 may be configured to, for example, keep the lamp of the lighting fixture turned off between the hours of one and five A.M. if there is no movement detected by a nearby environment sensor. In other embodiments, environment processing module 366 may interpret the signals received from sensors but may not make final fixture behavior determinations. In such embodiments, a main logic module (e.g., logic module 314, command and control module 356) for the control circuit 350 or logic included in processor 352 or memory 354 may make fixture behavior determinations (e.g., ballasts or lamps on, off, dimmed, illuminated, etc.) using input from, for example, environment processing module 366, scheduling module 362, timer 364, and fixture data 368.

Control circuit 350 is further shown to include traffic light module 370. Traffic light module 370 facilitates traffic light related control and communications activities for the outdoor lighting fixture. The traffic light control and communications activities may be those described above with reference to FIG. 2 or other traffic light command and communications activities. For example, traffic light module 370 can receive information from sensor 312 via sensor interface 318, process the information to determine if vehicle motion is present in the street, and transmit a "green light" command to a nearby traffic light in response to detecting vehicle motion on the street.

Controller 300 is shown to include a wired traffic system interface 388 in addition to a wireless traffic system interface 390 and RF transceiver 306. While in some embodiments controller 300 will include all of interfaces 388, 390 and RF transceiver 306, in other embodiments controller 300 will only include one or two of interfaces 388, 390 and RF transceiver 306. Wired traffic system interface 388 may be a jack, port, solder interface, wire terminal or other physical structure configured to receive a wire compatible with a nearby traffic control system or traffic light. In other embodiments wired traffic system interface 388 includes communications electronics for communicating with a traffic control system or traffic light using one or more standard or proprietary communications protocols. Wireless traffic system interface 390 may include a wireless transceiver (e.g., radio frequency, infrared, etc.) and antenna configured to communicate with a traffic light system or traffic light using one or more standard or proprietary communications protocols. The wireless technology and/or protocol used by wireless traffic system interface 390 may be the same as or different than those used by RF transceiver 306. In one exemplary embodiment RF transceiver 306 communicates with a lighting fixture network using a first communications protocol and wireless traffic system interface 390 communicates forms a communications link between the lighting fixture controller 300 and the traffic light system or traffic light using a second communications protocol. In addition to communicating commands or information to traffic light systems and traffic lights, traffic light module 370 may be configured to process information received from a traffic light system (e.g., traffic control device 130 of FIGS. 2, 3C). The information received by traffic light module 370 may include traffic light data such as the current traffic light status or current traffic light pattern. Traffic light module 370 may use historical traffic light data to determine future settings for the traffic lights.

Traffic light module 370 includes various sub-modules for determining how to command or communicate with the traffic light system or traffic light. Traffic light module 370 includes local change rules 372 and remote fixture change rules 374 for determining a light change instruction for a traffic light. Local change rules 372 may include rules for changing a status of a traffic light based on sensor data. For example, if sensor 312 detects a car underneath or approaching the lighting fixture associated with controller 300, local change rules 372 may receive the sensor data and send a light change instruction to interfaces 388, 390 for the vehicle. Local change rules 372 may include, before providing the light change instruction to the traffic light, checking with other lighting fixtures associated with other traffic lights to see if other vehicles are present in the intersection. Local change rules 372 may further receive data from traffic counter 380 regarding the number of vehicles at the intersection and may make a decision based on such data.

Remote fixture change rules 374 includes rules for changing the status of a traffic light based on data received from other lighting fixtures (via RF transceiver 306). For example, if the local change rules of a remote lighting fixture indicates that a vehicle is present, remote fixture change rules 374 may receive the indication via RF transceiver 306 and change the state of a traffic light in response to the rules. Remote fixture change rules 374 may further receive data from other lighting fixtures relating to a count of vehicles from each lighting fixture. Remote fixture change rules 374, or another remote fixture change rule of another lighting fixture, may determine a light change instruction by comparing a count of a first number of vehicles from one lighting fixture to a count of a second number of vehicles from another lighting fixture. The determination may includes comparing any number of counts of vehicles from multiple lighting fixtures. For example, if more vehicles are detected by one lighting fixture, remote fixture change rules 374 may generate a light change instruction for the traffic light closest or associated with said lighting fixture. Remote fixture change rules 374 may further include a duration of the light change in the light change instruction.

Traffic light module 370 further includes override client 376. Override client 376 may use received information (e.g., from traffic lights via interfaces 388, 390, via sensor 312, via RF transceiver 306, etc.) to override a current state of the traffic lights or a light change instruction from rules 372, 374. For example, if local change rules 372 indicate a desire to change a traffic light status, but remote fixture change rules 374 indicate that the traffic light status should stay the same in response to data from the other lighting fixtures, override module 376 may be used to override the decision of either of rules 372, 374 and provide data for RF transceiver 306 to transmit the override decision to the other lighting fixtures. As another example, override client 376 may use sensor data (e.g., motion data relating to a moving vehicle) to override a current traffic light status or light change instruction.

Traffic light module 370 further includes historical log 378. Historical log 378 stores traffic light data received by interfaces 388, 390, sensor data received from sensor interface 318 relating to vehicle frequency (e.g., a count of vehicle detected by the sensor), vehicle speed, or other vehicle properties, and other data relating to the traffic and traffic flow. For example, such traffic light data may include previous traffic light patterns of the traffic lights (e.g., how long the traffic lights stay in green and red states), all traffic light status data from a specified time period (e.g., one hour, one day, etc.), or other data indicating how often a traffic light changed or how many vehicles were present in the intersection at a given time. The various modules of circuit 350 and traffic light module 370 may use historical log 378 to predict when a light change instruction may need to be sent to a traffic light (e.g, if historical data in historical log 378 indicate that the traffic lights for an intersection change states often at a particular time of day, a new traffic light pattern may be chosen for the traffic light). Further, circuit 350 and module 370 may use historical log 378 to determine when to Traffic light module 370 further includes traffic counter 380. Traffic counter 380 receives data from interfaces 388, 390 and determines a frequency of traffic based on the traffic data. For example, traffic counter 380 may receive data regarding a count of vehicles that have appeared or are currently at the intersection, a count of vehicles that are or have waited at the intersection under a red light, etc. Traffic counter 380 may further receive traffic light pattern information and infer a frequency of traffic from the traffic light pattern information (e.g., inferring that one street has more traffic than another street based on the traffic lights for the first street remaining in a green state more often).

Traffic light module 370 further includes synchronization module 382. Synchronization module 382 receives traffic data (e.g, a traffic light pattern, a frequency of traffic from traffic counter 380) and synchronizes a traffic light pattern with the traffic data. For example, synchronization module 382 uses the traffic data to determine a traffic light pattern that allows for the smoothest flow of traffic. Synchronization module 382 may further receive data from the various modules of traffic light module 370 for such a determination. For example, synchronization module 382 may receive traffic data from remote fixture change rules 374 and determine a traffic light pattern that least conflicts with the other traffic lights. Further, synchronization module 382 may further use historical log 378 to predict future traffic patterns and to determine a new traffic light pattern.

Referring further to FIG. 3B, controller 300 includes circuitry configured with an algorithm to control on/off cycling of connected lighting fixtures, an algorithm to log usage information for the lighting fixture, an algorithm configured to prevent premature restrikes to limit wear on the lamps and ballast, and an algorithm configured to allow controller 300 to send and receive commands or information from other peer devices independently from a master controller or master transceiver.

Controller 300 is shown to include power relays 302 configured to controllably switch on or off high voltage power outputs that may be provided to first ballast 244 and second ballast 246 of FIG. 3A via wires 330, 331. It should be noted that in other exemplary embodiments, power relays 302 may be configured to provide a low voltage control signal, optical signal, or otherwise to the lighting fixture which may cause one or more ballasts, lamps, and/or circuits of the fluorescent lighting fixture that the controller serves to turn on and off. While power relays 302 are configured to provide high voltage power outputs to ballasts 244, 246, it should be appreciated that controller 300 may include a port, terminal, receiver, or other input for receiving power from a high voltage power source. In embodiments where a relatively low voltage or no voltage control signal is provided by relays 302, power for circuitry of controller 300 may be received from a power source provided to the lighting fixtures or from another source. In any embodiment of controller 300, appropriate power supply circuitry (e.g., filtering circuitry, stabilizing circuitry, etc.) may be included with controller 300 to provide power to the components of controller 300 (e.g., relays 302).

Referring still to FIG. 3B, controller 300 is shown to include wireless controller 305 and RF transceiver 306 which receives and provides data or control signals to/from circuit 350. Circuit 350 is configured to cause one or more lamps of the fluorescent lighting fixture to turn on and off via control signals sent to power relays 302. Circuit 350 can make a determination that an "on" or "off" signal should be sent to power relays 302 based on inputs received from RF transceiver 306 and wireless controller 305. For example, a command to turn the lighting fixture "off" may be received at RF transceiver 306 and interpreted by wireless controller 305. The command is provided to circuit 350 and, upon recognizing the "off" command, circuit 350 provides an appropriate control signal which causes a switch of one or more of power relays 302 off. Similarly, when sensor 312 experiences an environmental condition, logic module 314 may determine whether or not circuit 350 should change "on/off" states. For example, if a high ambient lighting level is detected by sensor 312, logic module 314 may determine that circuit 350 should change states such that power relays 302 are "off" Conversely, if a low ambient lighting level is detected by sensor 312, logic module 314 may cause circuit 350 to turn power relays 302 "on." Other control decisions, logic and activities provided by controller 300 and the components thereof are described below and with reference to other Figures.

When or after control decisions based on sensor 312 or commands received at RF transceiver 306 are made, in some exemplary embodiments, logic module 314 is configured to log usage information for the lighting fixture in memory 316. For example, if circuit 350 causes power relays 302 to change states such that the lighting fixture turns on or off, circuit 350 may inform logic module 314 of the state change and logic module 314 may log usage information based on the information. The form of the logged usage information can vary for different embodiments. For example, in some embodiments, the logged usage information includes an event identifier (e.g., "on", "off", cause for the state change, etc.) and a timestamp (e.g., day and time) from which total usage may be derived. In other embodiments, the total "on" time for the lighting fixture (or lamp set) is counted such that only an absolute number of hours that the lamp has been on (for whatever reason) has been tracked and stored as the logged usage information. In addition to logging or aggregating temporal values, each logic module 314 may be configured to process usage information or transform usage information into other values or information. For example, in some embodiments time-of-use information is transformed by logic module 314 to track the energy used by the lighting fixture (e.g., based on bulb ratings, known energy draw of the fixture in different on/off/partial on modes, etc.). In some embodiments, each logic module 314 will also track how much energy savings the lighting fixture is achieving relative to a conventional lighting fixture, conventional control logic, or relative to another difference or change of the lighting fixture. For the purposes of many embodiments of this disclosure, any such information relating to usage for the lighting fixture may be considered logged "usage information." In other embodiments, the usage information logged by module 314 is limited to on/off events or temporal aggregation of on states; in such embodiments energy savings calculations or other calculations may be completed by a master computer 202 or another remote device.

In an exemplary embodiment, controller 300 (e.g., via RF transceiver 306) is configured to transmit the logged usage information to remote devices such as master computer 202 of FIG. 3A. Circuit 350 may be configured to recall the logged usage information from sensor memory 316 at periodic intervals (e.g., every hour, once a day, twice a day, etc.) and to provide the logged usage information to RF transceiver 306 at periodic intervals for transmission back to master computer 202 or another remote device. In other embodiments, master computer 202 (or another network device) transmits a request for the logged information to RF transceiver 306 and the request is responded to by circuit 350 by transmitting back the logged usage information. In a preferred embodiment a plurality of controllers such as controller 300 asynchronously collect usage information for their fixture and control computer 202, via request or via periodic transmission of the information by the controllers, gathers the usage information for later use.

Wireless controller 305 is configured to handle situations or events such as transmission failures, reception failures, and the like. Wireless controller 305 may respond to such failures by, for example, operating according to a retransmission scheme or another transmit failure mitigation scheme. Wireless controller 305 may also control any other modulating, demodulating, coding, decoding, routing, or other activities of RF transceiver 306. For example, controller 300's control logic (e.g., controlled by logic module 314) may periodically include making transmissions to other controllers in a zone, making transmissions to particular controllers, or otherwise. Such transmissions can be controlled by wireless controller 305 and such control may include, for example, maintaining a token-based transmission system, synchronizing clocks of the various RF transceivers or controllers, operating under a slot-based transmission/reception protocol, or otherwise.

Referring still to FIG. 3B, sensor 312 may be an infrared sensor, an optical sensor, a camera, a temperature sensor, a photodiode, a carbon dioxide sensor, or any other sensor configured to sense environmental conditions such as a lighting level or occupancy of a space (e.g., a vehicle in a street). For example, in one exemplary embodiment, sensor 312 is a motion sensor and logic module 314 is configured to determine whether circuit 350 should change states (e.g., change the state of power relays 302) based on whether motion is detected by sensor 312 (e.g., detected motion reaches or exceeds threshold value). In the same or other embodiments, logic module 314 may be configured to use the signal from sensor 312 to determine an ambient lighting level. Logic module 314 may then determine whether to change lighting fixture states based on the ambient lighting level. For example, logic module 314 may use a condition such as time of day in addition to ambient lighting level to determine whether to turn the lighting fixture off or on. During a critical time of the day (e.g., when there is a lot of traffic), even if the ambient lighting level is high, logic module 314 may refrain from turning the lighting fixture off. In another embodiment, by way of further example, logic module 314 is configured to provide a command to turn the one or more lamps of the fluorescent lighting fixture on when logic module 314 detects motion (e.g., a moving vehicle) via the signal from sensor 312 and when logic circuit 314 determines that the ambient lighting level is below a threshold setpoint.

Referring yet further to FIG. 3B, circuit 350 is configured to prevent damage to lamps 240, 242 from manual or automatic control activities. Particularly, circuit 350 may be configured to prevent on/off cycling of lamps 240, 242 by holding the lamps in an "on" state for a predefined period of time (e.g., thirty minutes, fifteen minutes, etc.) even after the condition that caused the lamp to turn on is no longer true. Accordingly, if, for example, a low ambient lighting level causes circuit 350 to turn lamps 240, 242 on but then the ambient lighting level suddenly increases (the sun comes out), circuit 350 may keep the lamps on (even though the on condition expired) for a predetermined period of time so that the lamps are taken through their preferred cycle. Similarly, circuit 350 may be configured to hold the lamp in an "off" state for a predefined period of time since the lamp was last turned off to ensure that the lamp is given time to cool or otherwise settle after the last "on" state.

Referring yet further to FIG. 3B, logic module 314 may be configured to include a restrike violation module (e.g., in memory 316) that is configured to prevent logic module 314 from commanding circuit 350 to cause the fluorescent lamps to turn on while a restrike time is counted down. The restrike time may correspond with a maximum cool-down time for the lamp—allowing the lamp to experience its preferred strike-up cycle even if a command to turn the lamp back on is received at RF transceiver 306. In other embodiments, logic module 314 may be configured to prevent rapid on/off switching due to sensed motion, another environmental condition, or a sensor or controller error. Logic module 314 may be configured to, for example, entirely discontinue the on/off switching based on inputs received from the sensor by analyzing the behavior of the sensor, the switching, and a logged usage information. By way of further example, logic circuit 314 may be configured to discontinue the on/off switching based on a determination that switching based on the inputs from the sensor has occurred too frequently (e.g., exceeding a threshold number of "on" switches within a predetermined amount of time, undesired switching based on the time of day or night, etc.). Logic module 314 may be configured to log or communicate such a determination. Using such configurations, logic module 314 is configured to self-diagnose and correct undesirable behavior that would otherwise continue occurring based on the default, user, or system-configured settings.

According to one embodiment, a self-diagnostic feature would monitor the number of times that a fixture or device was instructed to turn on (or off) based upon a signal received from a sensor (e.g. motion, ambient light level, etc.). If the number of instructions to turn on (or off) exceeded a predetermined limit during a predetermined time period, logic module 314 could be programmed to detect that the particular application for the fixture or device is not well-suited to control by such a sensor (e.g. not an suitable application for motion control or ambient light-based control, etc.), and would be programmed to disable such a motion or ambient light based control scheme, and report/log this action and the basis. For example, if the algorithm is based on more than four instructions to turn on (or off) in a 24 hour period, and the number of instructions provided based on signals from the sensor exceeds this limit within this period, the particular sensor-based control function would be disabled, as not being suited to the application and a notification would be logged and provided to a user or facility manager. Of course, the limit and time period may be any suitable number and duration intended to suit the operational characteristics of the fixture/device and the application. In the event that a particular sensor-based control scheme in a particular zone is disabled by the logic module and/or control circuit, the fixture or device is intended to remain operational in response to other available control schemes (e.g. other sensors, time-based, user input or demand, etc.). The data logged by logic module 314 may also be used in a 'learning capacity' so that the controls may be more optimally tuned for the fixtures/devices in a particular application and/or zone. For example, logic module 314 may determine that disablement of a particular sensor-based control feature occurred due to an excessive number of instructions to turn on (or off) based on signals from a particular sensor that occurred within a particular time window, and may be reprogrammed to establish an alternate monitoring duration that excludes this particular time window for the particular sensor-based control scheme to 'avoid' time periods that are determined to be problematic. This ability to learn or self-update is intended to permit the system to adjust itself to update the sensor-based control schemes to different time periods that are more optimally suited for such a control scheme, and to avoid time periods that are less optimum for such a particular sensor-based control scheme.

Figure 3C:
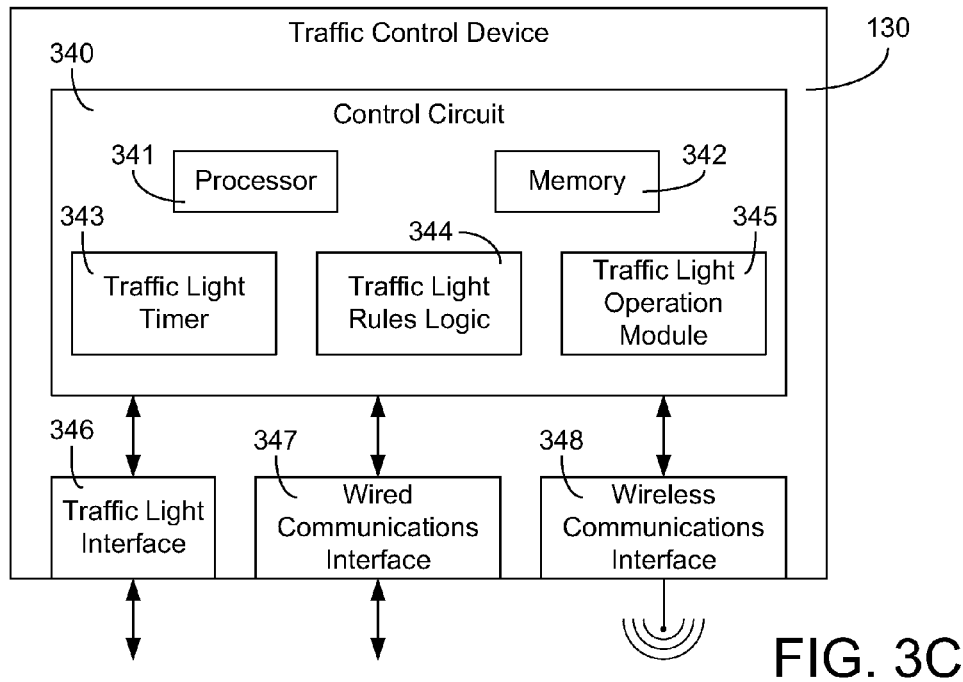
FIG. 3C is a block diagram of a traffic control device, according to an exemplary embodiment.

Referring now to FIG. 3C, a block diagram of a traffic control device 130 is shown in greater detail, according to an exemplary embodiment. Traffic control device 130 may be configured to control the traffic lights associated with an intersection (e.g., to operate the traffic lights in such a manner that allows traffic to flow the smoothest or fastest through the intersection at which the traffic lights are at). According to other exemplary embodiments, traffic control device 130 may control traffic lights associated with more than one intersection.

Traffic control device 130 includes a wired communications interface 347 and wireless communications interface 348 for sending and receiving data regarding operation of the traffic lights. Communications interfaces 347, 348 may receive data (e.g., a light change instruction) from a lighting fixture or another object either wirelessly connected to device 130 or connected to device 130 via a wired connection. For example, also referring to FIG. 2, communications interface 347 may be a wired interface for receiving an input from lighting fixture 102 or another lighting fixture. The data received by communications interfaces 347, 348 may include traffic light requests or commands (e.g., a light change instruction to change a state of the traffic lights), sensor data (e.g., motion sensor data relating to vehicles), road conditions, weather, or other data that may be used by traffic control device 130 to determine a traffic light schedule or pattern. Control circuit 340 may receive the data from communications interfaces 347, 348. Communications interfaces 347, 348 may further receive data from traffic light rules logic 344 (relating to traffic light rules and patterns) and traffic light operation module 345 (relating to the current status of the traffic lights) and transmit the data (either wirelessly or via a wired connection) to a lighting fixture.

Traffic control device 130 includes a control circuit 340 including a processor 341 and memory 342. Processor 341 and memory 342 may be of similar functionality as processor 352 and memory 354 of controller 300 for executing the systems and methods of the present disclosure. Control circuit 340 further includes traffic light timer 343. Timer 343 is a countdown timer to keep track of how long a current status of the traffic lights has stayed in the same state. For example, timer 343 may keep track of how long a traffic light stays in the "green" state or "red" state. Timer 343 may provide the time information to the other modules of control circuit 340 for determining a change in traffic light status.

Control circuit 340 further includes traffic light rules logic 344. Traffic light rules logic 344 controls the pattern (e.g., when to change the state of traffic lights between green and red and how long to leave each traffic light in each state) of each traffic light, according to an exemplary embodiment. For example, traffic light rules logic 344 may provide the traffic lights with commands or rules to follow of when to change between a green light, yellow light, and red light. Traffic light rules logic 344 may receive timer information from timer 343 to determine when to change the traffic light statuses. The commands are provided to traffic light interface 346 for transmitting the commands to the traffic lights of the intersection.

Traffic light rules logic 344 may be configured to adjust a traffic light pattern or traffic light rules based on historical data (either data received via interfaces 347, 348 or stored in memory 342). According to other exemplary embodiments, traffic light rules logic 344 may include a preset traffic light pattern (e.g., a pattern of changing traffic light statuses and how long each traffic light status should remain before changing again) for the traffic lights, and may only adjust the pattern at certain times (e.g., during a time when there is a lot of traffic or little traffic, during specific times of the day, etc.) or when a command is received from interfaces 347, 348. Traffic light rules logic 344 may be configured to only change a pattern if no vehicles are present in the vicinity of the intersection, if only one vehicle is present in the vicinity of the intersection, or if a designated number of vehicles are present in the vicinity of the intersection. Traffic light rules logic 344 may include or look up patterns from a database or otherwise have patterns stored in memory 342.

Control circuit 340 is further shown to include traffic light operation module 345. Traffic light operation module 345 may receive information from interfaces 347, 348 regarding a light change instruction, sensor data, or other data that may be used to determine a traffic light configuration. Traffic light operation module 345 uses the data to determine a traffic light pattern for the traffic lights of the intersection. Traffic light operation module 345 may change the patterns permanently, change the patterns temporarily to adjust to conditions indicated by the data, or both.

Traffic light operation module 345 may include adjusting a traffic light pattern based on a light change instruction or sensor data relating to vehicle movement. For example, if a light change instruction is received by operation module 345, module 345 may override the current pattern chosen by rules logic 344 or the current states of the traffic lights and provide a command to traffic light interface 346 based on the light change instruction. As another example, using the same data, operation module 345 may temporarily modify a traffic pattern of rules logic 344 (e.g., if a car is approaching a light that is scheduled to turn red shortly, operation module 345 may provide a command to leave the light in a green state until the vehicle passes through the light).

Traffic light operation module 345 may use the light change instruction or sensor data received to determine a traffic light pattern based on the number of vehicles detected. For example, received sensor data may be stored, and traffic light operation module 345 may use the stored data to determine a traffic light pattern based on the number of cars that historically appear at the intersection at given times. If one street of an intersection is busier than the other street (e.g., a motion count from a sensor in one direction of the intersection is greater than a motion count from another sensor of another direction of the intersection), traffic light operation module 345 may determine to leave the traffic lights of the busier street in a green state for a longer period of time.

Figure 3D:
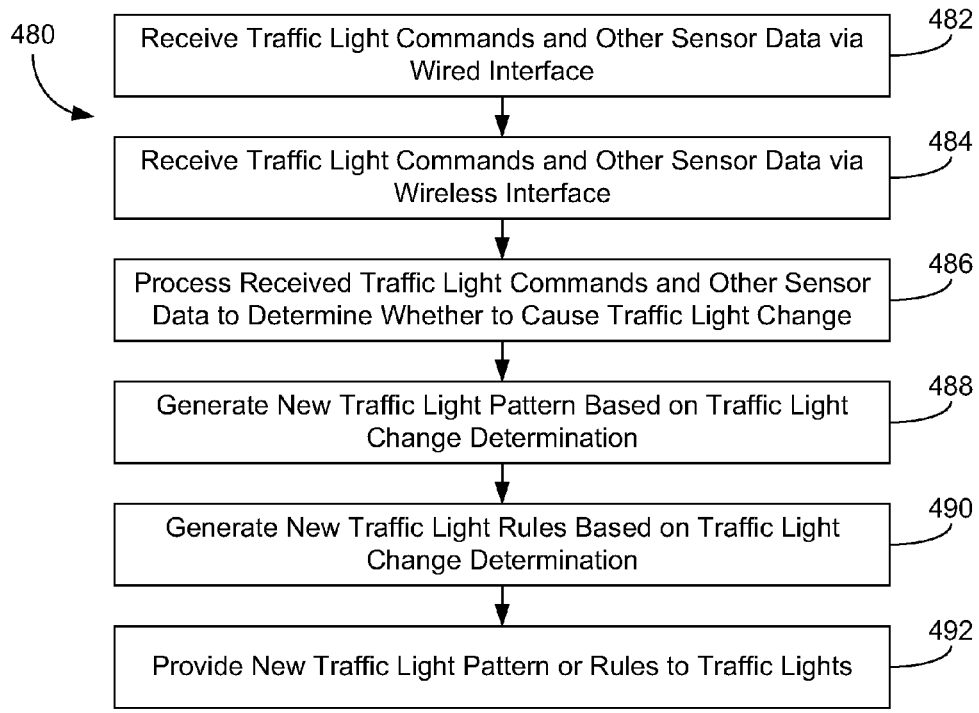
FIG. 3D is a flow chart of a process for using a traffic control device to change a traffic light state, according to an exemplary embodiment.

Referring now to FIG. 3D, a flow chart of a process 480 for using a traffic control device (e.g., device 130 of FIG. 3C) to change a traffic light state is shown, according to an exemplary embodiment. Process 480 includes receiving a light change instruction and other sensor data via a wired interface (step 482) and/or wireless interface (step 484). Various lighting fixtures may have either a wired connection or wireless connection with the traffic control device and may provide light change instructions and other sensor data in steps 482, 484. The light change instructions may include commands for changing a status of one or more traffic lights to accommodate detected vehicles, commands for changing a status of one or more traffic lights based on a schedule, etc. Other sensor data may include a time of day, a current ambient light level, motion data, or other detected objects.

Referring further to FIG. 3D, the traffic light commands and other sensor data received are processed to determine whether to cause a traffic light change (step 486).

For example, the traffic light commands, such as a light change instruction, may be used to cause a traffic light change. Based on the traffic light change determination, a new traffic light pattern is generated (step 488). For example, also referring to FIG. 3C, traffic light operation module 345 may receive the traffic light change determination and determine a new traffic light pattern (e.g., adjusting how long a light should stay in a certain state) based on the change. Based on the traffic light change determination, new traffic light rules are also generated (step 490). For example, also referring to FIG. 3C, traffic light rules logic 344 may receive the traffic light change determination and adjust traffic light rules. The traffic light operation module may then provide a new traffic light pattern or traffic light rules to the individual traffic lights (step 488) via a traffic light interface.

Referring now to FIG. 4A, a flow chart of a process 400 for changing a lighting fixture status based on traffic light data is shown, according to an exemplary embodiment. Process 400 includes receiving sensor data at an outdoor lighting fixture (step 402). The sensor data may indicate an absence of ambient light, the presence of a vehicle or another object, motion of a vehicle, or any other sensor data (e.g., motion data, ambient light data, etc.). Process 400 further includes processing the sensor data at the lighting fixture to determine the lighting fixture status (step 404). For example, the sensor data may indicate the presence of a moving vehicle, and the processing of the data may indicate a need to keep the lighting fixture in a fully illuminated state as a result. Process 400 further includes changing the lighting fixture status in response to the detected motion (or other sensor data) (step 406).

Process 400 further includes transmitting the motion indication to a traffic control device (e.g., device 130 of FIGS. 2, 3C) (step 408). Step 408 may additionally include the transmission of light change instructions or other instructions corresponding with the motion indication. The lighting fixture may receive motion information from other lighting fixtures (step 410). Process 400 further includes receiving traffic light data (step 412).

Process 400 further includes using traffic light data (received in step 412) or an indication of motion (or other sensor data) from the other lighting fixtures (received in step 410) to determine a duration of the lighting fixture status (step 414). For example, the lighting fixture may use the current traffic light pattern to determine a schedule for the lighting fixture for turning on and off (e.g., a duration for which the lighting fixture should stay on). The lighting fixture may synchronize with the current traffic light pattern such that the lighting fixture is illuminated whenever certain traffic lights are in a green state (due to the chance that a vehicle may drive past the lighting fixture, but saving energy when there is no chance a vehicle can legally travel down the street).

The traffic light data or sensor data may further include traffic data regarding the amount of traffic at the intersection associated with the traffic lights. The traffic data may be used by the lighting fixture. For example, heavy traffic may indicate a need for the lighting fixture to remain in an illuminated state based on the high probability a vehicle will drive past the lighting fixture.

Referring now to FIG. 4B, a flow chart of a process 420 for using a lighting fixture sensor to update a traffic light status is shown, according to an exemplary embodiment. Process 420 includes detecting the presence of a vehicle using a motion sensor or another sensor (step 422). A signal relating to the detection of the vehicle may be provided to another lighting fixture (step 424). The signal may be wirelessly transmitted or transmitted via a wired network. The signal may continue to be transmitted until it is received at a traffic control device (step 426). The lighting fixtures and traffic control device may then use the received signal to update a traffic light status. For example, the traffic light status may change based on the presence of the vehicle and how close the vehicle is to the traffic lights. The traffic light status for the traffic light in the direction of the approaching vehicle may change to a green state in order to allow the vehicle to pass through the intersection, for example. The traffic light status may otherwise be adjusted based on the data provided by the signal (e.g., the presence of more than one vehicle, historical data received from the sensor, etc.).

Referring now to FIG. 4C, a flow chart of a process 440 for using multiple lighting fixture sensors to determine a traffic light pattern is shown, according to an exemplary embodiment. Process 440 includes receiving sensor data from multiple directions (step 442). Sensor data may be provided from multiple lighting fixtures of a lighting fixture system or otherwise. The sensor data may be motion sensor data relating to the detection of vehicles. Upon receiving the data, a frequency of traffic may be determined based on the sensor data (step 444). The frequency of traffic may be based upon the speeds of the vehicles, the number of vehicles detected in a specific area, how close the vehicles are to the intersection including the traffic lights, or otherwise.

Using the frequency of traffic data, a traffic light pattern may be determined (step 446). The traffic light pattern may be an optimal pattern for allowing for the smoothest flow of traffic through the intersection. For example, if one street is "busier" (e.g., has more vehicles) than the other street of the intersection, the determined traffic light pattern may allow the first street to stay in a green state longer than the other street. The traffic light pattern information may be transmitted to the controller for each individual traffic light (step 448).

Figure 5:
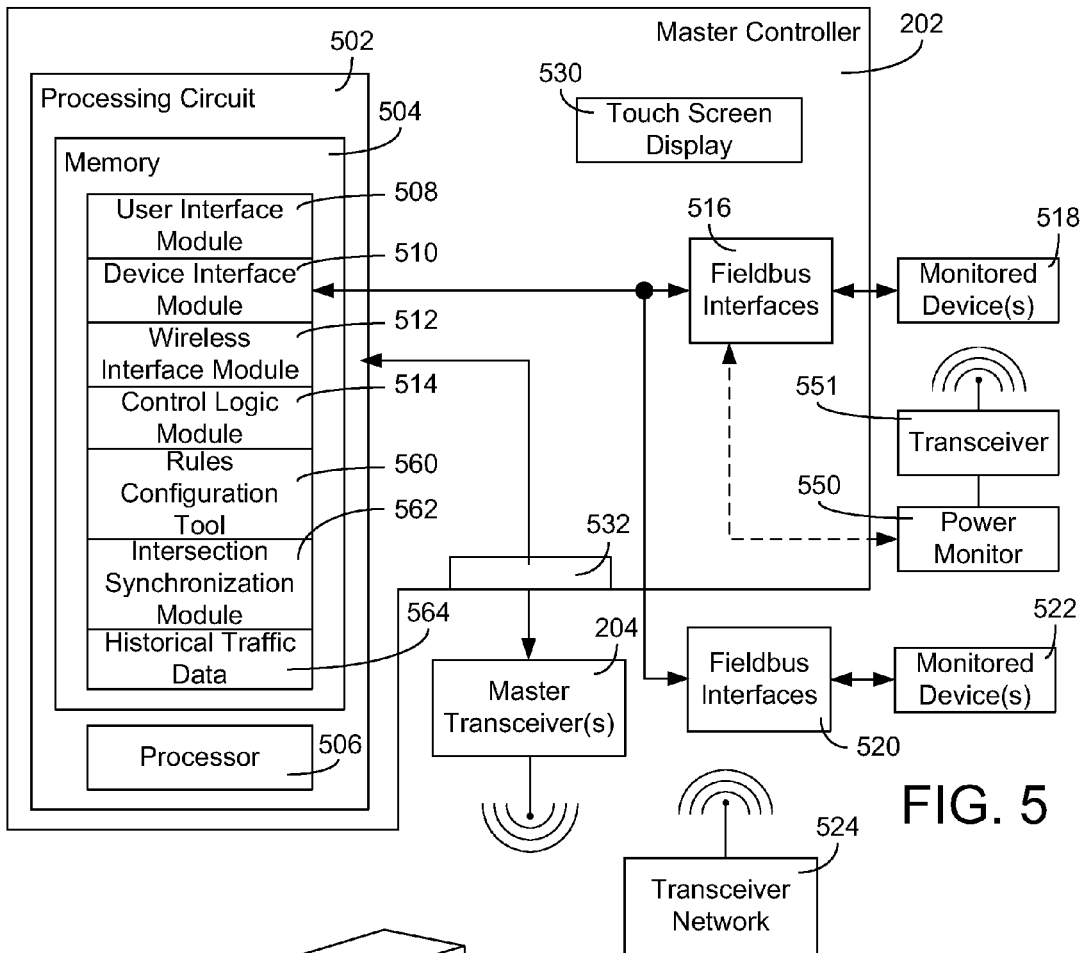
FIG. 5 is a more detailed block diagram of the master controller of FIG. 3A, according to an exemplary embodiment.

Referring now to FIG. 5, a more detailed block diagram of master controller 202 is shown, according to an exemplary embodiment. Master controller 202 may be configured as the "master controller" described in U.S. application Ser. No. 12/240,805, filed Sep. 29, 2008, and incorporated herein by reference in its entirety. Master controller 202 is generally configured to receive user inputs (e.g., via touchscreen display 530) and to set or change settings of the lighting system based on the user inputs.

Referring further to FIG. 5, master controller 202 is shown to include processing circuit 502 including memory 504 and processor 506. In an exemplary embodiment, master controller 202 and more particularly processing circuit 502 are configured to run a Microsoft Windows Operating System (e.g., XP, Vista, etc.) and are configured to include a software suite configured to provide the features described herein. The software suite may include a variety of modules (e.g., modules 508-514) configured to complete various activities of master controller 202. Modules 508-514 may be or include computer code, analog circuitry, one or more integrated circuits, or another collection of logic circuitry. In various exemplary embodiments, processor 506 may be a general purpose processor, a specific purpose processor, a programmable logic controller (PLC), a field programmable gate array, a combination thereof, or otherwise and configured to complete, cause the completion of, and/or facilitate the completion of the activities of master controller 202 described herein. Memory 504 may be configured to store historical data received from lighting fixture controllers or other building devices, configuration information, schedule information, setting information, zone information, or other temporary or archived information. Memory 504 may also be configured to store computer code for execution by processor 506. When executed, such computer code (e.g., stored in memory 504 or otherwise, script code, object code, etc.) configures processing circuit 502, processor 506 or more generally master controller 202 for the activities described herein.

Touch screen display 530 and more particularly user interface module 508 are configured to allow and facilitate user interaction (e.g., input and output) with master controller 202. It should be appreciated that in alternative embodiments of master controller 202, the display associated with master controller 202 may not be a touch screen, may be separated from the casing housing the control computer, and/or may be distributed from the control computer and connected via a network connection (e.g., Internet connection, LAN connection, WAN connection, etc.). Further, it should be appreciated that master controller 202 may be connected to a mouse, keyboard, or any other input device or devices for providing user input to master controller 202. Control computer is shown to include a communications interface 532 configured to connect to a wire associated with master transceiver 204.

Communications interface 532 may be a proprietary circuit for communicating with master transceiver 204 via a proprietary communications protocol. In other embodiments, communications interface 532 may be configured to communicate with master transceiver 204 via a standard communications protocol. For example, communications interface 532 may include Ethernet communications electronics (e.g., an Ethernet card) and an appropriate port (e.g., an RJ45 port configured for CAT5 cabling) to which an Ethernet cable is run from master controller 202 to master transceiver 204. Master transceiver 204 may be as described in U.S. application Ser. Nos. 12/240,805, 12/057,217, or 11/771,317 which are each incorporated herein by reference. Communications interface 532 and more generally master transceiver 204 are controlled by logic of wireless interface module 512. Wireless interface module 512 may include drivers, control software, configuration software, or other logic configured to facilitate communications activities of master controller 202 with lighting fixture controllers. For example, wireless interface module 512 may package, address format, or otherwise prepare messages for transmission to and reception by particular controllers or zones. Wireless interface module 512 may also interpret, route, decode, or otherwise handle communications received at master transceiver 204 and communications interface 532.

Referring still to FIG. 5, user interface module 508 may include the software and other resources for the display and the handling of automatic or user inputs received at the graphical user interfaces of master controller 202. While user interface module 508 is executing and receiving user input, user interface module 508 may interpret user input and cause various other modules, algorithms, routines, or sub-processes to be called, initiated, or otherwise affected. For example, control logic module 514 and/or a plurality of control sub-processes thereof may be called by user interface module 508 upon receiving certain user input events. User interface module 508 may also be configured to include server software (e.g., web server software, remote desktop software, etc.) configured to allow remote access to the display. User interface module 508 may be configured to complete some of the control activities described herein rather than control logic module 514. In other embodiments, user interface module 508 merely drives the graphical user interfaces and handles user input/output events while control logic module 514 controls the majority of the actual control logic.

Control logic module 514 may be the primary logic module for master controller 202 and may be the main routine that calls, for example, modules 508, 510, etc. Control logic module 514 may generally be configured to provide lighting control, energy savings calculations, demand/response-based control, load shedding, load submetering, HVAC control, building automation control, workstation control, advertisement control, power strip control, "sleep mode" control, or any other types of control. In an exemplary embodiment, control logic module 514 operates based off of information stored in one or more databases of master controller 202 and stored in memory 504 or another memory device in communication with master controller 202. The database may be populated with information based on user input received at graphical user interfaces and control logic module 514 may continuously draw on the database information to make control decisions. For example, a user may establish any number of zones, set schedules for each zone, create ambient lighting parameters for each zone or fixture, etc. This information is stored in the database, related (e.g., via a relational database scheme, XML sets for zones or fixtures, or otherwise) and recalled by control logic module 514 as control logic module 514 proceeds through its various control algorithms.

Control logic module 514 may include any number of functions or sub-processes. For example, a scheduling sub-process of control logic module 514 may check at regular intervals to determine if an event is scheduled to take place. When events are determined to take place, the scheduling sub-process or another routine of control logic module 514 may call or otherwise use another module or routine to initiate the event. For example, if the schedule indicates that a zone should be turned off at 5:00 pm, then when 5:00 pm arrives the scheduling sub-process may call a routine (e.g., of wireless interface module) that causes an "off" signal to be transmitted by master transceiver 204. Control logic module 514 may also be configured to conduct or facilitate the completion of any other process, sub-process, or process steps conducted by master controller 202 described herein.

Referring further to FIG. 5, memory 504 further includes rules configuration tool 560, intersection synchronization module 562, and historical traffic data 564 for completing various activities of master controller 202 relating to traffic light control. Rules configuration tool 560 is used to determine traffic light change rules and other rules associated with traffic lights and intersections. For example, rules configuration tool 560 may be used to determine a traffic light pattern (e.g., when to change traffic light states of an intersection), rules for changing a traffic light based on an event, etc.

Rules configuration tool 560 may be a map-based tool, according to an exemplary embodiment. Rules configuration tool 560 may generate a map or other graphic display for viewing the location of intersections and traffic lights, the current status of the intersections and traffic lights, current sensor readings of surrounding sensors, etc. For example, rules configuration tool 560 may generate a graphic display for touch screen display 530, allowing a user of display 530 to select an intersection, traffic light, or other fixture and view data or settings for the traffic light or lighting fixture (e.g., a current sensor reading relating to motion data, a current status of the traffic light or lighting fixture, a schedule for the traffic light, or lighting fixture, etc.) or change settings of the traffic light or lighting fixture (e.g., overriding a traffic light state in response for a need for an emergency vehicle to travel through the intersection or to redirect traffic, overriding a lighting fixture state in response to a detected event, etc.).

Figure 6:
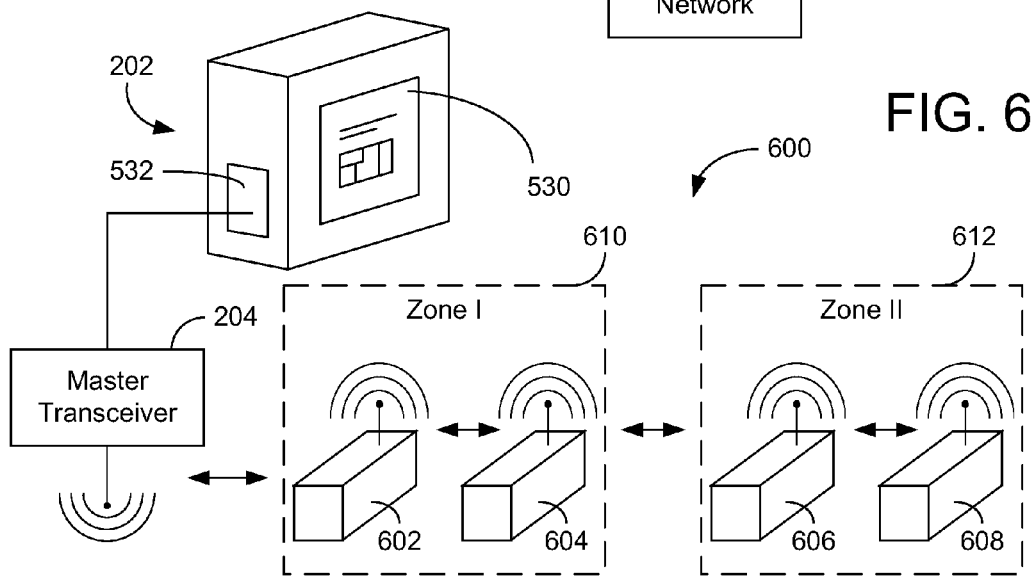
FIG. 6 is a diagram of an outdoor lighting system having multiple zones, according to an exemplary embodiment.

Intersection synchronization module 562 may be used to group and manage multiple traffic lights from multiple intersections. For example, multiple intersections may be grouped together and intersection synchronization module 562 may group the intersections such that any traffic light instructions, sensor data, or other data may be provided to all traffic lights of the grouped intersections. Intersection synchronization module 562 may further include logic for determining how to group intersections and traffic lights. For example, all intersections nearby one another may be grouped together, all intersections or traffic lights that share a common street may be grouped together, etc. Intersection synchronization module 562 may further include logic for classifying an intersection or a traffic light in a particular zone (e.g., as shown in FIG. 6).

Historical traffic data 564 includes traffic light data, intersection data, or any other data relating to the operation of traffic lights and intersections. For example, historical traffic data 564 may include a recent history of traffic light state changes or traffic light patterns, a recent history of a frequency of traffic or count of vehicles for an intersection, etc.

Referring further to FIG. 5, device interface module 510 facilitates the connection of one or more field devices, sensors, or other inputs not associated with master transceiver 204. For example, fieldbus interfaces 516, 520 may be configured to communicate with any number of monitored devices 518, 522. The communication may be according to a communications protocol which may be standard or proprietary and/or serial or parallel. Fieldbus interfaces 516, 520 can be or include circuit cards for connection to processing circuit 502, jacks or terminals for physically receiving connectors from wires coupling monitored devices 518, 522, logic circuitry or software for translating communications between processing circuit 502 and monitored devices 518, 522, or otherwise. In an exemplary embodiment, device interface module 510 handles and interprets data input from the monitored devices and controls the output activities of fieldbus interfaces 516, 520 to monitored devices 518, 522.

Fieldbus interfaces 516, 520 and device interface module 510 may also be used in concert with user interface module 508 and control logic module 514 to provide control to the monitored devices 518, 522. For example, monitored devices 518, 522 may be mechanical devices configured to operate a motor, one or more electronic valves, one or more workstations, machinery stations, a solenoid or valve, or otherwise. Such devices may be assigned to zones similar to the lighting fixtures described above and below or controlled independently. User interface module 508 may allow schedules and conditions to be established for each of devices 518, 522 so that master controller 202 may be used as a comprehensive energy management system for a facility. For example, a motor that controls the movement of a spinning advertisement may be coupled to the power output or relays of a controller very similar if not identical to controller 300 of FIG. 3B. This controller may be assigned to a zone (e.g., via user interfaces at touchscreen display 530) and provided a schedule for turning on and off during the day. In another embodiment, the electrical relays of the controller may be coupled to other building devices such as video monitors for informational display, exterior signs, task lighting, audio systems, or other electrically operated devices.

Referring further to FIG. 5, power monitor 550 is shown as coupled to fieldbus interfaces 516 in an exemplary embodiment. However, power monitor 550 may also or alternatively be coupled to its own controller or RF transceiver 551 for communicating with master transceiver 204. Power monitor 550 may generally be configured to couple to building power resources (e.g., building mains input, building power meter, etc.) and to receive or calculate an indication of power utilized by the building or a portion of the building. This input may be received in a variety of different ways according to varying embodiments. For example, power monitor 550 may include a current transformer (CT) configured to measure the current in the mains inlet to a building, may be coupled to or include a pulse monitor, may be configured to monitor voltage, or may monitor power in other ways. Power monitor 550 is intended to provide "real time" or "near real time" monitoring of power and to provide the result of such monitoring to master controller 202 for use or reporting. When used with power monitor 550, control logic module 514 may be configured to include logic that sheds loads (e.g., sends off signals to lighting fixtures via a lighting fixture controller network, sends off signals to monitored devices 518, 522, adjusts ambient light setpoints, adjusts schedules, shuts lights off according to a priority tier, etc.) to maintain a setpoint power meter level or threshold. In other exemplary embodiments, control logic module 514 may store or receive pricing information from a utility and shed loads if the metered power usage multiplied by the pricing rate is greater than certain absolute thresholds or tiered thresholds. For example, if daily energy cost is expected to exceed $500 for a building, control logic module 506 may be configured to change the ambient light setpoints for the lighting fixtures in the building until daily energy cost is expected to fall beneath $500. In an exemplary embodiment, user interface module 508 is configured to cause a screen to be displayed that allows a user to associate different zones or lighting fixtures with different demand/response priority levels. Accordingly, a utility provider or internal calculation determines that a load should be shed, control logic module 514 will check the zone or lighting fixture database to shed loads of the lowest priority first while leaving higher priority loads unaffected.

Referring now to FIG. 6, a diagram of a facility lighting system 600 for use with the lighting fixture system of the present disclosure is shown, according to an exemplary embodiment. Facility lighting system 600 is shown to include master controller 202 that is configured to conduct or coordinate control activities relative to multiple lighting fixture controllers.

Master controller 202 is preferably configured to provide a graphical user interface to a local or remote electronic display screen for allowing a user to adjust control parameters, turn lighting fixtures on or off, or to otherwise affect the operation of lighting fixtures in a facility. For example, master controller 202 is further shown to include touch screen display 530 for displaying such a graphical user interface and for allowing user interaction (e.g., input and output) with master controller 202 (as described in FIG. 5). Various exemplary graphical user interfaces for display on touch screen display 530 and control activities associated therewith are described in subsequent paragraphs and with reference to subsequent Figures of the present disclosure. It should be noted that while master controller 202 is shown in FIG. 6 as housed in a wall-mounted panel it may be housed in or coupled to any other suitable computer casing or frame. The user interfaces are intended to provide an easily configurable lighting and/or energy management system for a facility. The user interfaces are intended to allow even untrained users to reconfigure or reset a lighting system using relatively few clicks. In an exemplary embodiment, the user interfaces do not require a keyboard for entering values. Advantageously, users other than building managers may be able to setup, interact with, or reconfigure the system using the provided user interfaces.

Referring further to FIG. 6, master controller 202 is shown as connected to master transceiver 204. Master transceiver 204 may be a radio frequency transceiver configured to provide wireless signals to a network of controllers. In FIG. 6, master transceiver 204 is shown in bi-directional wireless communication with a plurality of lighting fixture controllers 602, 604, 606, 608. FIG. 6 further illustrates controllers 602, 604 forming a first logical group 610 identified as "Zone I" and controllers 606, 608 forming a second logical group 612 identified as "Zone II." Master controller 202 may be configured to provide different processing or different commands for zones 610, 612. While master controller 202 is configured to complete a variety of control activities for lighting fixture controllers 602, 604, 606, 608, in many exemplary embodiments of the present application, each controller associated with a lighting fixture (e.g., controllers 602, 604, 606, 608) includes circuitry configured to provide a variety of "smart" or "intelligent features" that are either independent of master controller 202 or operate in concert with master controller 202.

Further, zones 610, 612 may further include one or more traffic lights or traffic control devices for traffic lights. For example, zone 610 may include traffic lights that have a wired or wireless connection with lighting fixture controllers 602, 604, and zone 612 may include traffic lights that have a wired or wireless connection with lighting fixture controllers 606, 608. As another example, traffic lights (or the traffic lights of an intersection) may be grouped with other traffic lights of other intersections in a zone based on the location of the traffic lights, a common street shared by the traffic lights, or otherwise. Master controller 202 may then provide control activities for the plurality of traffic lights via lighting fixture controllers 602, 604, 606, 608. For example, light change instructions, sensor data, light change rules, or other data may be provided by master controller 202 to all the traffic lights of a zone.

Master controller 202 may be configured to provide different commands for zones 610, 612 as described above. For example, master controller 202 may provide one set of commands to zone 610 and another set of commands based on a traffic light status to zone 612. Zone 610 may be a zone of lighting fixtures and traffic lights for one street and zone 612 may be a zone of lighting fixtures and traffic lights for a second street. As another example, the lighting fixtures of zone 610 may receive a command to be in an illuminated state, while the lighting fixtures of zone 612 may receive a command to be in an off state. Further, light change instructions or other traffic light commands may be provided to an individual traffic light of a zone 610, 612 via its associated lighting fixture (e.g., providing a light change instruction to change a light from "green" to "red" for one stoplight and another light change instruction to change another light from "red" to "green" for another stoplight). Master controller 202 may further provide separate commands for lighting fixtures of a single zone or otherwise.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An outdoor lighting fixture for communicating with a traffic light system, the outdoor lighting fixture comprising:
   a ballast for providing current to at least one lamp;
   a fixture housing at least partially surrounding the ballast and the at least one lamp;
   a mount configured to hold the fixture housing to a pole;
   a control circuit wired to the ballast;
   a sensor wired to the control circuit; and
   a radio frequency transceiver wired to the control circuit;
   wherein the control circuit is configured to process inputs from the sensor to determine whether to send a light change instruction to the traffic system via the radio frequency transceiver.

2. The outdoor lighting fixture of claim 1, wherein the control circuit is configured to assign a priority to the light change instruction and to send a representation of the priority to the traffic system with the light change instruction.

3. The outdoor lighting fixture of claim 1, wherein the control circuit is configured to count a first number of vehicles using the inputs from the sensor.

4. The outdoor lighting fixture of claim 3, wherein the radio frequency transceiver is configured to receive a second count of vehicles on a different street and the control circuit is configured to determine a light change order by comparing the first number of vehicles to the second number of vehicles.

5. The outdoor lighting fixture of claim 3, wherein the control circuit is configured to determine a duration for the light change instruction based on the first count of the number of vehicles.

6. The outdoor lighting fixture of claim 5, wherein the radio frequency transceiver is configured to receive a second count of vehicles on a different street and the control circuit is configured to determine the duration for the light change instruction based on the first count and the second count of the number of vehicles.

7. A system for controlling a traffic light at an intersection of a first street and a second street, comprising:
   a first street light oriented to illuminate the first street and having a first motion sensor pointed to detect vehicle traffic on the first street;
   a second street light oriented to illuminate the second street and having a second motion sensor pointed to detect vehicle traffic on the second street;
   a command system for the traffic light, wherein the first street light and the second street light communicate detected vehicle traffic on the first street and the second street to the command system via radio frequency transceivers of the first street light and the second street light, and wherein the command system changes the traffic light based on the detected vehicle traffic on the first street and the second street.

8. The system of claim 7, wherein the command system is configured to compare the detected vehicle traffic on the first street and the second street to determine a precedence for the traffic light change.

9. The system of claim 8, wherein the command system is configured to use the comparison of detected vehicle traffic to determine a duration for the traffic light change.

10. The system of claim 9, wherein the command system is configured to determine whether a light change cleared the traffic waiting on the first street or the second street.

11. The system of claim 10, wherein the command system is configured to adjust the duration of the next traffic light change based on the determination of whether a light change cleared the traffic.

12. A network of outdoor lighting fixtures, comprising:
   a first outdoor lighting fixture comprising a motion sensor and configured to detect vehicle traffic on a street using signals from the motion sensor, the first outdoor lighting fixture further comprising a first radio frequency transceiver;
   a second outdoor lighting fixture comprising a second radio frequency transceiver;
   wherein the first outdoor lighting fixture is configured to cause the first radio frequency transceiver to transmit an indication of detected vehicle traffic to the second radio frequency transceiver;
   wherein the second outdoor lighting fixture is configured to provide the indication of detected vehicle traffic to at least one of another outdoor lighting fixture and a traffic light system.

13. The network of outdoor lighting fixtures of claim 12, wherein the first outdoor lighting fixture is configured to brighten in response to detected vehicle traffic.

14. The network of outdoor lighting fixtures of claim 13, wherein the second outdoor lighting fixture is configured to brighten in response to receiving the indication of detected vehicle traffic.

15. The network of outdoor lighting fixtures of claim 12, wherein the second outdoor lighting fixture includes a wired interface to the traffic light system.

16. The network of outdoor lighting fixtures of claim 12, wherein the second outdoor lighting fixture uses the second radio frequency transceiver to transmit the indication of detected vehicle motion to the traffic light system.

17. The network of outdoor lighting fixtures of claim 12, wherein the traffic light system is configured to aggregate indications of detected vehicle traffic from a plurality of outdoor lighting fixtures having motion sensors.

18. The network of outdoor lighting fixtures of claim 17, wherein the traffic light system is configured to determine at least one of a precedence and a duration for a traffic light change at an intersection based on the aggregated indications of detected vehicle traffic.

\* \* \* \* \*